(12) United States Patent
Tashiro

(10) Patent No.: US 6,701,465 B1
(45) Date of Patent: Mar. 2, 2004

(54) METHOD AND APPARATUS FOR MANAGEMENT OF DEFECT INFORMATION IN A DISK SYSTEM

(75) Inventor: Masami Tashiro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/539,947

(22) Filed: Mar. 31, 2000

(30) Foreign Application Priority Data

Jul. 6, 1999 (JP) .......................................... 11-192313

(51) Int. Cl.$^7$ ................................................ G06F 11/00
(52) U.S. Cl. ............................................ 714/54; 714/5
(58) Field of Search .......................... 714/54, 8, 7, 5, 714/42, 27

(56) References Cited

U.S. PATENT DOCUMENTS

| | | | |
|---|---|---|---|
| 4,498,146 A | * | 2/1985 | Martinez .................... 711/115 |
| 5,146,571 A | * | 9/1992 | Logan .......................... 714/8 |
| 5,935,258 A | * | 8/1999 | Klein ........................... 714/8 |
| 6,249,888 B1 | * | 6/2001 | Sasaki et al. ................ 714/710 |
| 6,279,089 B1 | * | 8/2001 | Schibilla et al. ............. 711/162 |
| 6,385,736 B1 | * | 5/2002 | Jeong et al. .................... 714/8 |

FOREIGN PATENT DOCUMENTS

| | | |
|---|---|---|
| DE | 8400628 | 2/1984 |
| JP | 2278572 | 11/1990 |

\* cited by examiner

Primary Examiner—Scott Baderman
Assistant Examiner—Christopher S. McCarthy
(74) Attorney, Agent, or Firm—Greer, Burns & Crain, Ltd.

(57) ABSTRACT

In a defect information management method and apparatus of the present invention, a defect list contains a sequence of sets of first defect items with respective offset addresses thereof, each first defect item indicating a location of one of first defects on the storage medium, each of the offset addresses, exclusive of the final one, indicating a relative location of a following one of the corresponding set of first defect items for the offset address in the sequence from a beginning of the defect list. A second defect item is added to an end of the defect list when a second defect in a portion of the storage medium inclusive of a location identified by one of the sets of first defect items is detected. An offset address of the second defect item with respect to the beginning of the defect list is calculated. The offset address of the one of the sets of first defect items is changed to the calculated offset address of the second defect item, so that the second defect can be located by using the resulting defect list.

8 Claims, 21 Drawing Sheets

FIG. 3
PRIOR ART

| HEAD NO. | SECTOR NO. | | | | | | |
|---|---|---|---|---|---|---|---|
| | 0 | 1 | 2 | 3 | 4 | 5 | 6 |
| 0 | 0 | 1 | 2 | 3 | 4 | 5 | 6 |
| 1 | 7 | S1 | 8 | 9 | 10 | 11 | 12 |
| 2 | 13 | 14 | 15 | R2 | 17 | S3 | 18 |
| 3 | 19 | 20 | 21 | 22 | 16 | SP | SP |

FIG. 4
PRIOR ART

| | | |
|---|---|---|
| S1 | HEAD NO. | 1 |
| | SECTOR NO. | 1 |
| R2 | 1ST HEAD NO. | 2 |
| | 1ST SECTOR NO. | 3 |
| | 2ND HEAD NO. | 3 |
| | 2ND SECTOR NO. | 4 |
| S3 | HEAD NO. | 2 |
| | SECTOR NO. | 5 |

|   |    |                  |    |
|---|----|------------------|----|
| 0 | S1 | HEAD NO.         | 1  |
| 1 |    | SECTOR NO.       | 1  |
| 2 | S3 | HEAD NO.         | 2  |
| 3 |    | SECTOR NO.       | 5  |
| 4 | OFFSET ADDRESS |      | 5  |
| 5 | R2 | 1ST HEAD NO.     | 2  |
| 6 |    | 1ST SECTOR NO.   | 3  |
| 7 |    | 2ND HEAD NO.     | 3  |
| 8 |    | 2ND SECTOR NO.   | 4  |
| 9 | OFFSET ADDRESS |      | -1 |

30 → (table)
31 → row 4
32 → row 9

(A)          (B)

US 6,701,465 B1

METHOD AND APPARATUS FOR MANAGEMENT OF DEFECT INFORMATION IN A DISK SYSTEM

BACKGROUND OF THE INVENTION

1. Field of the Invention

The present invention generally relates to a defect information management method and apparatus, and more particularly to a method and apparatus for management of defect information used to locate defects of a storage medium in a magnetic disk system.

2. Description of the Related Art

FIG. 1 schematically shows a magnetic disk system in which defect information, used to locate defects of a storage medium, is handled.

A typical example of the magnetic disk system is a hard disk drive that includes a number of platters as the storage medium, each platter requiring two read/write heads, one for each side.

As shown in FIG. 1, the magnetic disk system 1 generally comprises a magnetic disk 2, a spindle motor 3, a read/write head 4, a head arm 5, a voice coil motor (VCM) 6, a rotating shaft 7, a spindle shaft 8, a motor controller/driver (MC/D) 9, a micro control unit (MCU) 10, a flash read-only memory (flash ROM) 11, a hard disk controller (HDC) 12, an interface circuit (I/F) 13, a data buffer 14, and a read/write channel 15.

In the magnetic disk system 1 of FIG. 1, the magnetic disk 2 is a storage medium for recording information. The magnetic disk 2 is accessed by the read/write head 4 so as to read information from or write information to the magnetic disk 2. The disk 2 is fixed to the spindle 8 of the spindle motor 3, and the spindle motor 3 rotates the disk 2 around the spindle 8.

The MCU 10 controls the spindle motor 3 by using the motor controller/driver (MC/D) 9. The MCU 10 controls the read/write channel 15 so as to supply a reading/recording signal to the read/write head 4. The read/write head 4 is positioned over the disk surface of the magnetic disk 2 rotated by the spindle motor 3. In accordance with the received reading/recording signal, the read/write head 4 produces magnetic fields to read and record bit streams on the appropriate track of the disk 2.

The read/write head 4 is connected to the head arm 5, and the head arm 5 is associated with the VCM 6. The VCM 6 is an actuating mechanism that positions the read/write head 4 over the appropriate track of the disk 2. The MCU 10 controls the VCM 6 by using the MC/D 9. Under the control by the MCU 10, the VCM 6 moves the read/write head 4 in a radial direction of the disk 2, so as to allow the read/write head 4 to trace the appropriate track of the disk 2.

A host system (not shown in FIG. 1) sends a control signal to the HDC 12 via the I/F 13. The HDC 12 receives the control signal and delivers it to the MCU 10, and the MCU 10 controls the entire disk system in response to the received control signal. The flash ROM 11 stores information that was processed by the MCU 10.

The data buffer 14 is made up of a dynamic random access memory (DRAM). The data buffer 14 temporarily stores information that was processed by the MCU 10. Further, the data buffer 14 provides a storage area in which the defect information, used to locate defects of the storage medium 2, is laid out.

FIG. 2A and FIG. 2B show a data structure on the storage medium of the magnetic disk system of FIG. 1.

In the magnetic disk system of FIG. 1, the read/write head 4 is moved along the disk surface of the disk 2 which is rotated by the motor 3. A circular path that the disk 2 traces out under the head 4 is called a track. The magnetic disk 2 is usually a metal disk covered with a magnetic material for recording information. As shown in FIG. 2A, the disk 2 contains a number of tracks "Tr1" through "Trn" on the disk surface. Each track is identified by a track number. A sector is a unit of a track that is physically read or written at the same time. In the example of FIG. 2A, tracks are divided into a number of sectors "S1" through "Sm". Each sector is identified by a sector number.

In the case where the magnetic disk 2 is in the form of a number of platters (for example, a hard disk drive), a cylinder that is a stack of tracks at one actuator position is defined. Typically, in such a magnetic disk system, the storage medium is divided into a number of cylinders, and each cylinder is identified by a cylinder number.

FIG. 2B shows a format of data in each of the number of sectors "S1" through "Sm" of the magnetic disk 2 for the example of FIG. 2A. As shown in FIG. 2B, each sector is made up of a servo information field "SB" and a data field "D". The data field D contains information bits recorded in the disk 2. The servo information field SB contains servo information used to position the read/write head 4 over a desired track of the magnetic disk 2.

In order to identify respective defects of the magnetic disk 2, a conventional defect list is produced. Once a defect at any location of the disk 2 is detected, defect information, indicative of the location of the defect on the disk 2, is inserted into the conventional defect list. When producing the conventional defect list, a layout table that indicates arrangement of normal sectors and defective sectors on the disk 2 is often used.

FIG. 3 shows a conventional layout table which is used to indicate arrangement of normal sectors and defective sectors on a storage medium.

In the layout table of FIG. 3, a head number is provided to specify one of the rows of the table, and it indicates a particular position on the storage medium where the read/write head is located for a corresponding one of the platters of the storage medium. In the present example, the head number ranges from 0 to 3, and there are four rows in this table. In the layout table of FIG. 3, a sector number is provided to specify one of the columns of the table, and it indicates a particular position on the same track of the storage medium. In the present example, the sector number ranges from 0 to 6, and there are seven columns in this table.

One of the records in columns and rows of the conventional layout table of FIG. 3 is normally described by an identifier, which is hereinafter called a logical sector identifier.

As shown in FIG. 3, the logical sector identifier in the row of head0 changes from 0 to 6. No defect item is contained in the row of head0. The logical sector identifier in the row of head1 starts from 7.

When a defect item is included as one of the records in the layout table of FIG. 3, the defect item is described by a different identifier, which is hereinafter called a defect identifier. In the present example, two kinds of defect which may take place on the storage medium are considered: slip defects and alternative defects.

If a slip defect exists in a certain sector of the storage medium, the access to the defective sector of the storage medium jumps from a preceding sector before the defective sector to a following sector after the defective sector. The defect identifier for slip defects consists of the character "S" and a sequential number. In the layout table of FIG. 3, the records at the locations (head1, sector1) and (head2, sector5) are indicated by "S1" and "S3", which shows that the slip defects (the first and third defects) exist at these locations of the storage medium. The defect item "S1" is contained in the row of head1, and the logical sector identifier in the row of head1 changes from 7 to 12 by taking no account of the sector "S1" with the slip defect.

If an alternative defect exists in a certain sector of the storage medium, the access to the defective sector of the storage medium jumps to another secondary sector of the storage medium. The defect identifier for alternative defects consists of the character "R" and a sequential number. The identifier for a secondary sector for an alternative defect becomes the logical sector identifier for the location of the alternative defect.

In FIG. 3, "SP" indicates a spare sector in the storage medium. In the layout table of FIG. 3, the record at the location (head2, sector3) is indicated by "R2", which shows that the alternative defect (the second defect) exists at this location of the storage medium. The record at the location (head3, sector4) is described by "16", which shows that the secondary sector exists at the location of the storage medium.

FIG. 4 shows a conventional defect list which is used to identify the location of each of defects of a storage medium.

The conventional defect list of FIG. 4 has been produced by using the conventional layout table of FIG. 3. In the conventional defect list of FIG. 4, the slip defect "S1" exists at the location (head1, sector 1) of the storage medium. The alternative defect "R2" exists at the primary location (head2, sector3), and the secondary location for the alternative defect R2 is (head3, sector4). Further, the slip defect "S3" exists at the location (head2, sector5).

As is apparent from FIG. 4, in the conventional defect list, the defect items for "slip" defect include only one set of the head number and sector number, but the defect items for "alternative" defect include two sets of the head number and sector number to indicate the primary and secondary locations.

In producing the conventional defect list, the above-described defect items for slip defects and alternative defects in one of the cylinders of the storage medium are first stored, and thereafter the head number and sector number for every value of the logical sector identifier in the same cylinder is sequentially determined.

FIG. 5 shows a conventional process for adding new defect items to the conventional defect list which was produced in the above manner.

In FIG. 5, suppose that a conventional defect list (indicated by (A) in FIG. 5) was already produced to identify respective locations of primary defects on the storage medium (or the magnetic disk 2). The primary defects of the storage medium were detected at the manufacturing process. On the other hand, if other defects on the storage medium are detected after the manufacturing process, such defects are called secondary defects. The conventional defect list initially includes primary defect items for all the cylinders of the storage medium, and can be used to locate the primary defects of the storage medium.

The primary defect items in the conventional defect list are grouped according to the cylinder number (cylinder0, cylinder1, . . . , cylinder"n"). Specifically, the primary defect items are made up of cylinders defect items, cylinder1 defect items, . . . , cylinder"n" defect items, which are arrayed in sequential order of the cylinder number.

In FIG. 5, reference numeral 21 indicates the cylinder0 defect items that are at the beginning of the list, reference numeral 22 indicates a new defect item added to the list, and reference numeral 23 indicates the starting position of the subsequent cylinder defect items (or the cylinder2 through cylinder"n" defect items).

For example, if a secondary defect in the cylinder0 of the storage medium is detected after the conventional defect list was produced, it is necessary to add the cylinder0 secondary defect item 22 to the conventional defect list that contains only the primary defect items.

As indicated by (B) in FIG. 5, according to the conventional process, the cylinders secondary defect item 22 is inserted at the end of the existing cylinders defect items in the list. After the secondary defect item 22 is inserted, the subsequent-cylinder defect items (which are, in this example, the cylinder1 through cylinder"n" defect items) are entirely transferred to the end of the added secondary defect item 22.

FIG. 6 is a flowchart for explaining a conventional defect information addition process.

As shown in FIG. 6, at a start of the conventional defect information addition process, a corresponding address of the conventional defect list for the beginning of a new defect item to be added to the list is determined by using the conventional layout table of FIG. 3 (S100). In order to obtain this address, it is necessary to detect a cylinder number to which the new defect item pertains as well as an address of the conventional defect list for the end of the existing defect items with the same cylinder number.

After the step S100 is performed, a corresponding address of the conventional defect list for the end of the new defect item is determined by using a size (or the number of bits) of the new defect item (S101).

After the step S101 is performed, the new defect item is added to the conventional defect list at the location thereof indicated by the beginning address (S102).

After the step S102 is performed, the subsequent-cylinder defect items are entirely transferred to the location of the list indicated by the end address of the new defect item (S103).

The above-mentioned defect information addition process requires the transfer of all the subsequent-cylinder defect information when adding the new defect information to the defect list. The transfer of all the subsequent-cylinder defect information significantly lowers the efficiency of data processing by the conventional method. It is difficult for the conventional method to provide quick and efficient management of the defect list when adding new defect information thereto.

SUMMARY OF THE INVENTION

In order to overcome the problems described above, preferred embodiments of the present invention provide an improved defect information management method and apparatus that quickly and efficiently carries out the management of defect information in a magnetic disk system without the need for the transfer of all the subsequent-cylinder defect information when adding new defect information.

According to one preferred embodiment of the present invention, a defect information management method includes the steps of: providing a defect list which contains a sequence of sets of first defect items with respective offset addresses thereof, each first defect item indicating a location of one of first defects on a storage medium, each of the offset addresses, exclusive of the final one, indicating a relative location of a following one of the corresponding set of first defect items for the offset address in the sequence from a beginning of the defect list; adding a second defect item to an end of the defect list when a second defect in a portion of the storage medium inclusive of a location identified by one of the sets of first defect items is detected; calculating a relative location of the second defect item from the beginning of the defect list; and changing the offset address of the one of the sets of first defect items to the calculated location of the second defect item, so that the second defect can be located by using the resulting defect list.

The defect information management method of the above preferred embodiment of the invention does not require the transfer of all the subsequent-cylinder defect information when adding new defect information. The defect information management method of the present invention is effective in providing quick and efficient management of defect information of the storage medium in a magnetic disk system.

According to another preferred embodiment of the present invention, a defect information management method includes the steps of: providing a defect list which contains a sequence of sets of first defect items, the sets of first defect items being arranged in sequential order of cylinder numbers of a storage medium corresponding to the respective sets, each first defect item indicating a location of one of first defects on the storage medium; determining, when a second defect in a portion of the storage medium inclusive of a location identified by one of the sets of first defect items is detected, a second defect item as well as a next set of first defect items following the one of the sets of first defect items in the sequence; calculating a size of the next set of first defect items and a size of the second defect item; transferring the next set of first defect items from an original location thereof to an end of the defect list, so as to create a vacant area in the defect list at the original location; and adding the second defect item to the original location of the defect list when the size of the next set of first defect items is larger than the size of the second defect item.

The defect information management method of the above preferred embodiment of the invention does not require the transfer of all the subsequent-cylinder defect information when adding new defect information. The defect information management method of the present invention is effective in providing quick and efficient management of defect information in the magnetic disk system.

According to another preferred embodiment of the present invention, a defect information management apparatus includes: a defect list which contains a sequence of sets of first defect items with respective offset addresses thereof, each first defect item indicating a location of one of first defects on a storage medium, each of the offset addresses, exclusive of the final one, indicating a relative location of a following one of the corresponding set of first defect items for the offset address in the sequence from a beginning of the defect list; a defect-item adding unit which adds a second defect item to an end of the defect list when a second defect in a portion of the storage medium inclusive of a location identified by one of the sets of first defect items is detected; a relative-location calculating unit which calculates a relative location of the second defect item from the beginning of the defect list; and an offset-address changing unit which changes the offset address of the one of the sets of first defect items to the calculated location of the second defect item, so that the second defect can be located by using the resulting defect list.

The defect information management apparatus of the above preferred embodiment of the invention does not require the transfer of all the subsequent-cylinder defect information when adding new defect information. The defect information management apparatus of the present invention is effective in providing quick and efficient management of defect information in the magnetic disk system.

According to another preferred embodiment of the present invention, a defect information management apparatus includes: a defect list which contains a sequence of sets of first defect items, the sets of first defect items being arranged in sequential order of cylinder numbers of a storage medium corresponding to the respective sets, each first defect item indicating a location of one of first defects on the storage medium; a determining unit which determines, when a second defect in a portion of the storage medium inclusive of a location identified by one of the sets of first defect items is detected, a second defect item as well as a next set of first defect items following the one of the sets of first defect items in the sequence; a calculating unit which calculates a size of the next set of first defect items and a size of the second defect item; a transferring unit which transfers the next set of first defect items from an original location thereof to an end of the defect list, so as to create a vacant area in the defect list at the original location; and an adding unit which adds the second defect item to the original location of the defect list when the size of the next set of first defect items is larger than the size of the second defect item.

The defect information management apparatus of the above preferred embodiment of the invention does not require the transfer of all the subsequent-cylinder defect information when adding new defect information. The defect information management apparatus of the present invention is effective in providing quick and efficient management of defect information in the magnetic disk system.

BRIEF DESCRIPTION OF THE DRAWINGS

Other objects, features and advantages of the present invention will become apparent from the following detailed description when read in conjunction with the accompanying drawings in which:

FIG. 3 is a diagram showing a conventional layout table used to indicate arrangement of normal sectors and defective sectors on the storage medium;

FIG. 4 is a diagram showing a conventional defect list used to identify each of the locations of defects on the storage medium;

FIG. 8 is a diagram showing a defect list according to the first preferred embodiment of the invention;

DETAILED DESCRIPTION OF PREFERRED EMBODIMENTS

Figure 1:
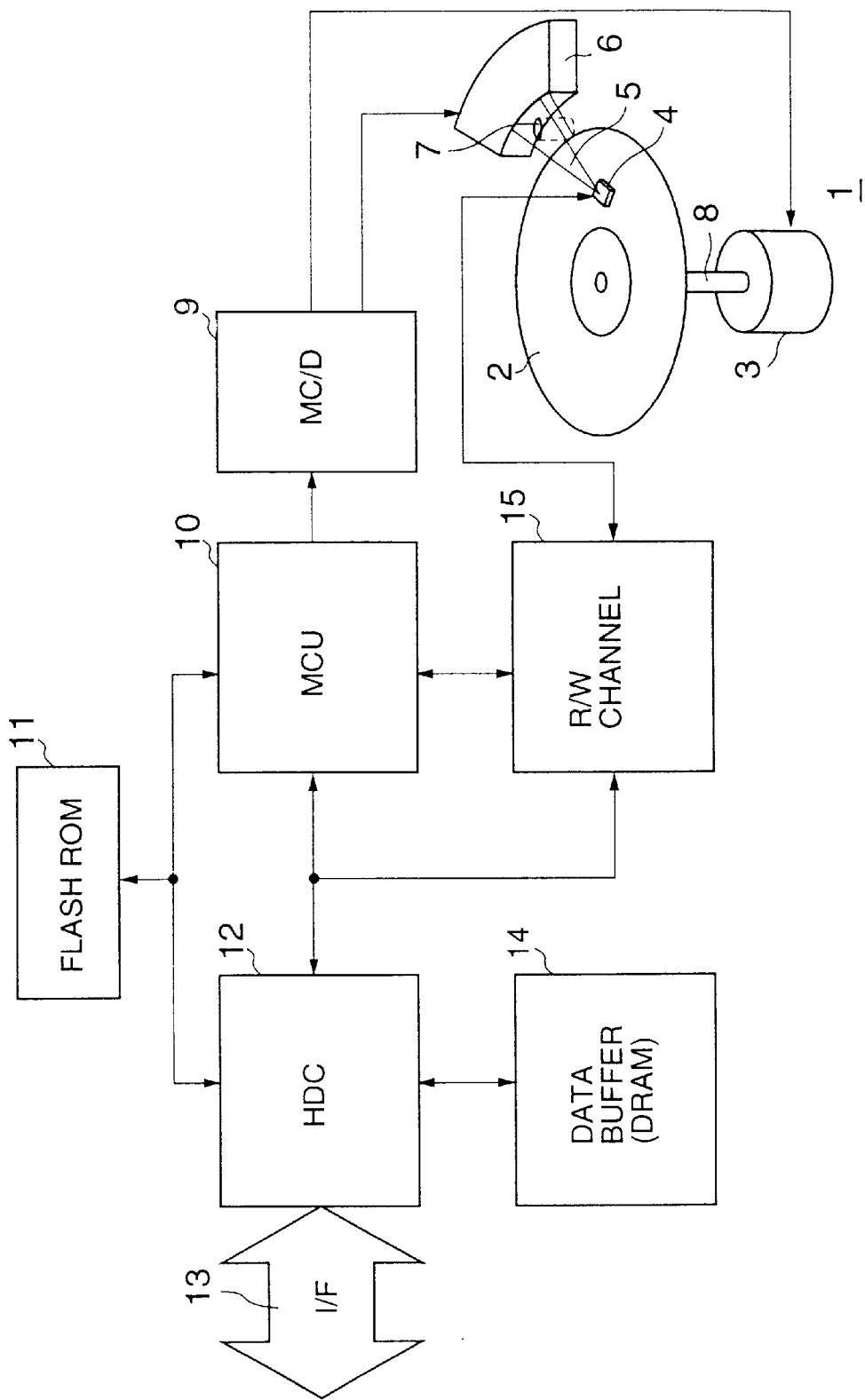
FIG. 1 is a block diagram of a magnetic disk system.
Figure 2A:
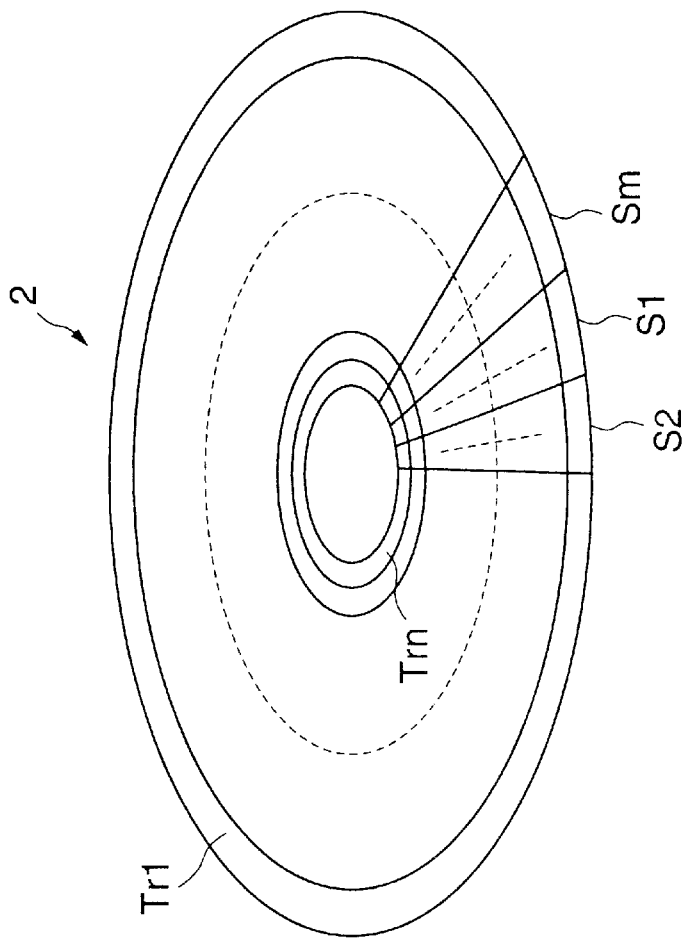
FIG. 2A and FIG. 2B are diagrams showing a data structure on a storage medium of the magnetic disk system.
Figure 2B:
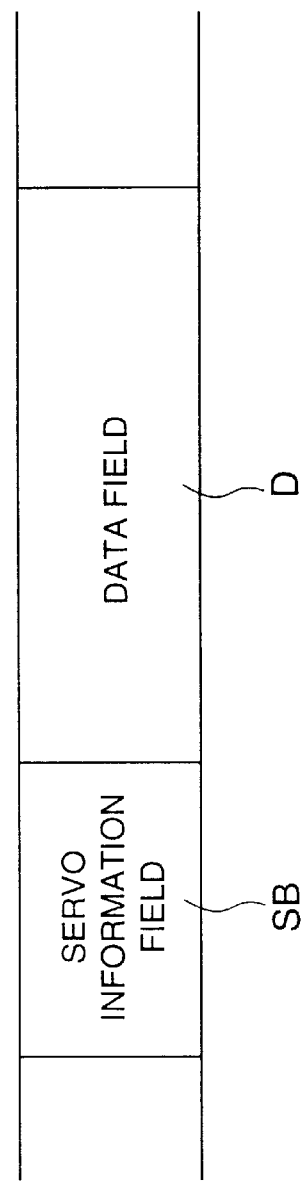
Figure 5:
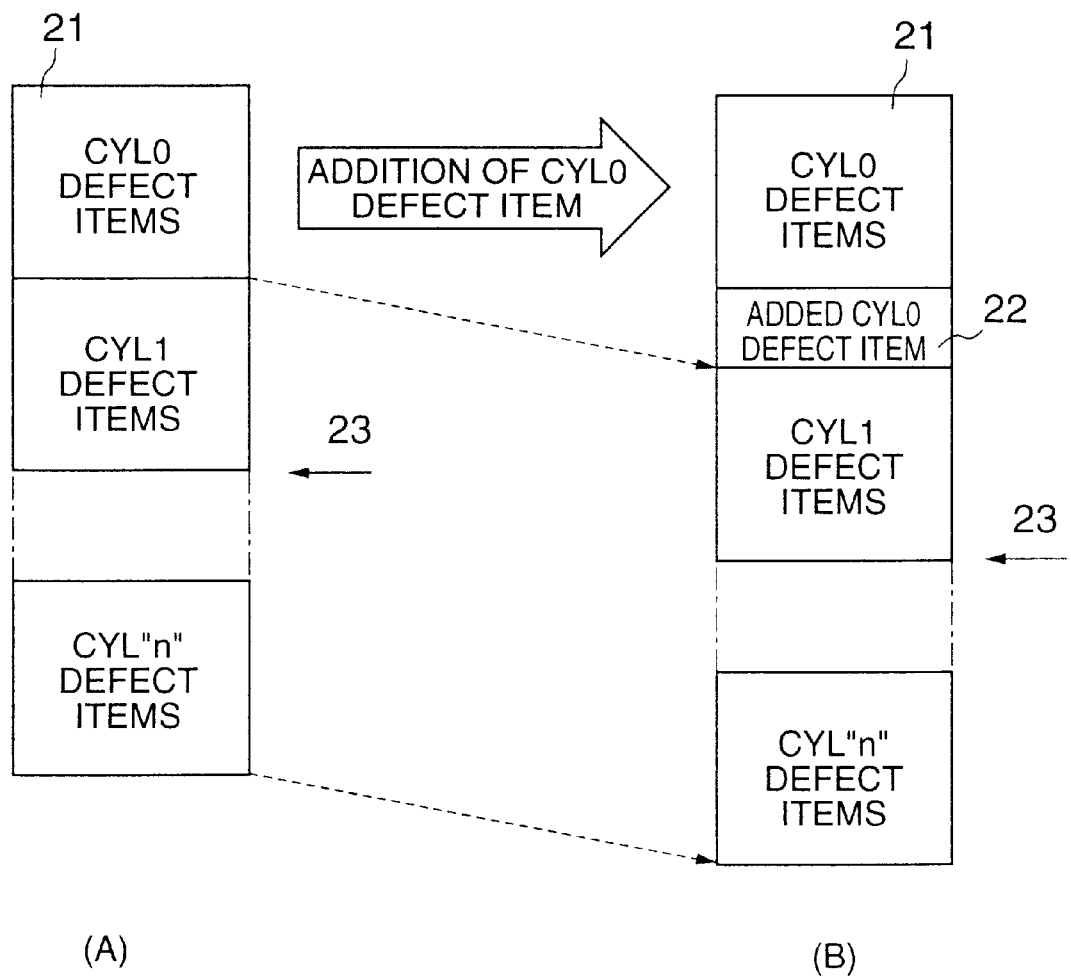
FIG. 5 is a diagram for explaining a conventional process of addition of new defect information to the conventional defect list.
Figure 6:
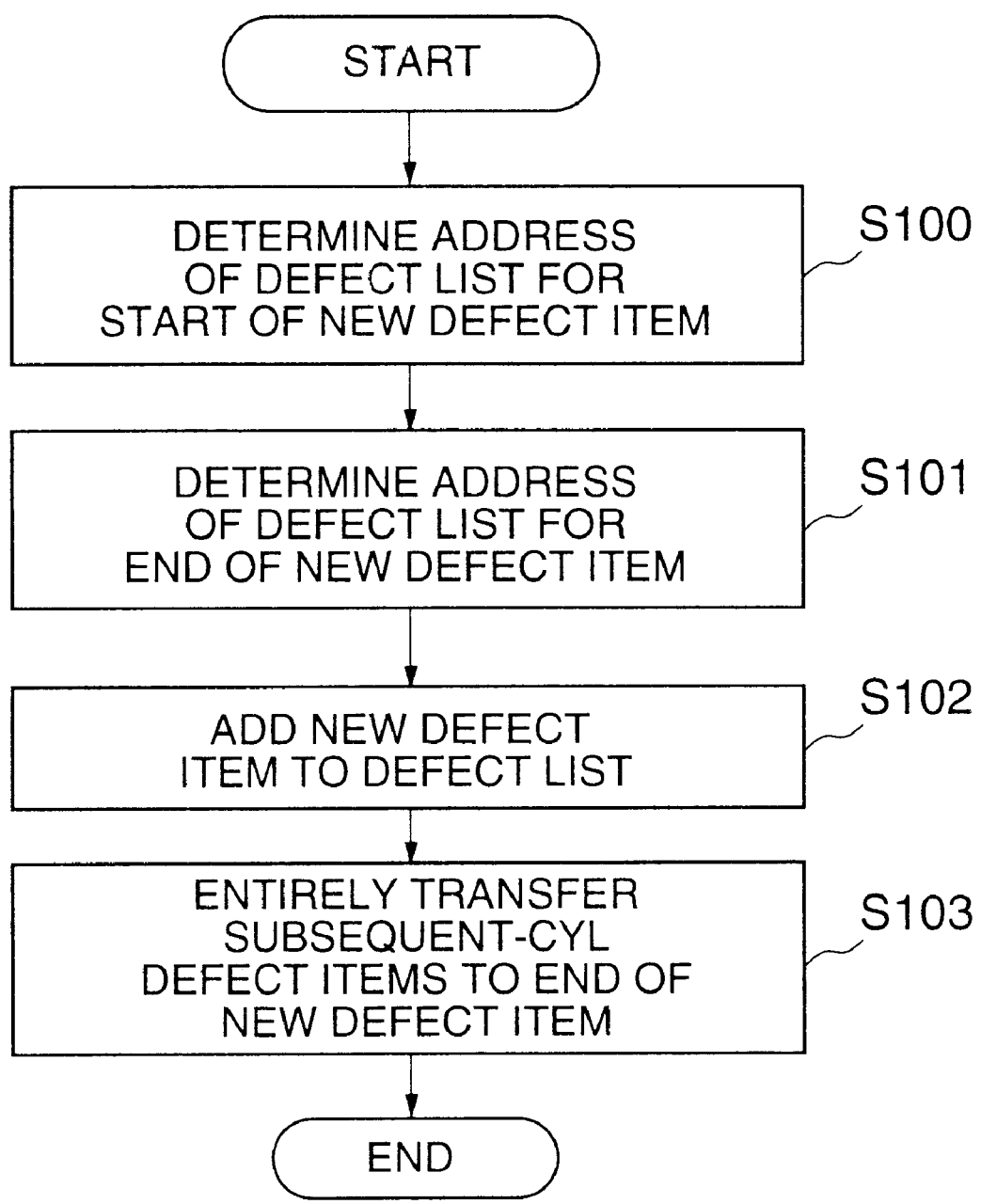
FIG. 6 is a flowchart for explaining a conventional defect information addition process.

A description will now be provided of preferred embodiments of the present invention with reference to the accompanying drawings.

In the following embodiments, the defect information management method and apparatus of the invention are applied to the magnetic disk system shown in FIG. 1, in order to facilitate understanding of the differences between the present invention and the related art. This does not mean that the present invention is limited to the configuration of FIG. 1. The elements in the following embodiments which are essentially the same as corresponding elements in FIG. 1 are designated by the same reference numerals, and a description thereof will be omitted.

Figure 7:
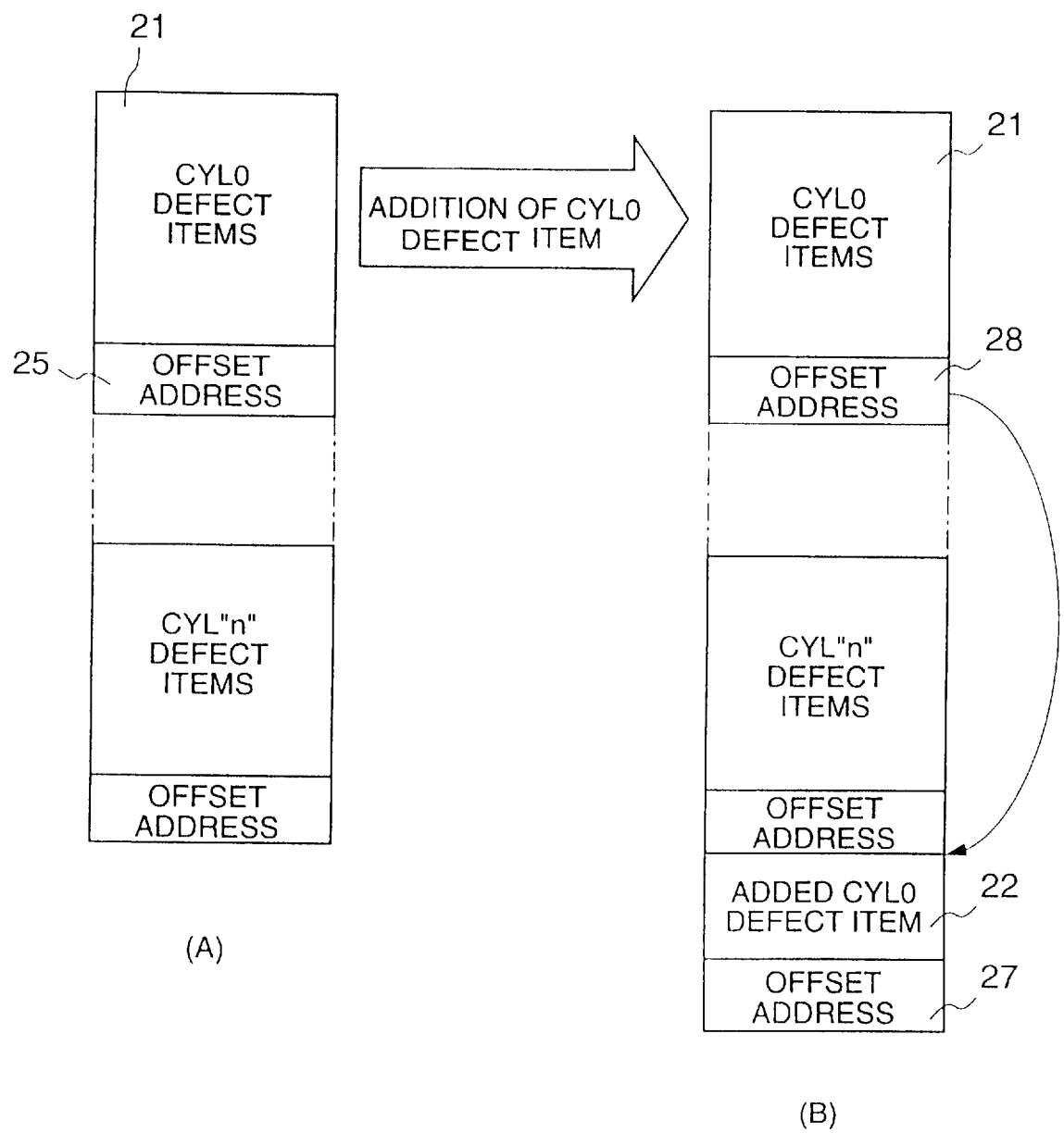
FIG. 7 is a diagram for explaining a process of addition of new defect information to a defect list according to a first preferred embodiment of the invention.

FIG. 7 shows a process of addition of new defect information to a defect list according to a first preferred embodiment of the invention.

The defect list of the present embodiment, which is indicated by (A) in FIG. 7, is stored in the magnetic disk 2 of the magnetic disk system of FIG. 1. Further, the stored defect list is transferred to the data buffer 14 for the access. Suppose that the defect list was produced with a sequence of sets of primary defect items with respective offset addresses thereof. The sets of the primary defect items in the defect list are arrayed in sequential order of the cylinder number. Each primary defect item indicates a location of one of the primary defects on the magnetic disk 2. Each of the offset addresses (excluding the last one) indicates a relative location of the following one of the corresponding set of primary defect items for the offset address in the sequence from the beginning of the defect list.

The addition process of the present embodiment is executed by the MCU 10. The defect-item adding step/unit, the relative-location calculating step/unit, the offset-address changing step/unit and the new defect-item adding step/unit in the defect information management method and apparatus of the claims are achieved by program control instructions stored in the MCU 10.

In FIG. 7, reference numeral 21 indicates the cylinder0 defect items that are at the beginning of the list, reference numeral 22 indicates a secondary defect item added to the list, and reference numeral 25 indicates an offset address of the cylinder1 defect items from the beginning of the list.

For example, if a secondary defect in the cylinder0 of the storage medium is detected after the defect list was produced, it is necessary to add the cylinders secondary defect item 22 to the defect list that contains only the primary defect items.

As indicated by (B) in FIG. 7, according to the process of the addition of the present embodiment, the cylinder0 secondary defect item 22 is inserted at the end of the defect list. An offset address 27 of the secondary defect item 22 is attached to the secondary defect item 22. It is supposed that the actual secondary defect for the secondary defect item 22 is detected in the cylinder0 of the magnetic disk 2.

After the offset address 27 is attached, the offset address 25 of the cylinder0 defect items 21 is changed to an offset address 26 that indicates a relative location of the added secondary defect item 22 from the beginning of the defect list. As the offset address 26 (or the relative location of the secondary defect item 22) is provided by the process of the addition of the present embodiment, it is not necessary that the cylinder1 through cylinder"n" defect items be entirely transferred to the end of the secondary defect item 22. The secondary defect on the magnetic disk 2 can be located by using the resulting defect list.

FIG. 8 shows a defect list according to the present embodiment.

The defect list of FIG. 8 is produced by using the layout table of FIG. 3. In the defect list of FIG. 8, the slip defect "S1" exists at the location (head1, sector 1) of the magnetic disk 2. The alternative defect "R2" exists at the primary location (head2, sector3), and the secondary location for the alternative defect R2 is (head3, sector4). Further, the slip defect "S3" exists at the location (head2, sector5).

As indicated by the element 30 in FIG. 8, a unique address of the defect list is assigned for each of the head numbers and sector numbers for the cylinders of the magnetic disk 2. The defect items in the defect list are grouped according to the kind of defects. In the present example, the defect items for the slip defects S1 and S3 are first listed as (S1, head1, sector1) and (S3, head2, sector5) at the beginning of the defect list, and the defect items for the alternative defect R2 are listed as (R2, 1, head2, sector3) and (R2, 2, head3, sector4) after the end of the slip defect items. As indicated by the elements 31 and 32 in FIG. 8, an offset address 31 is attached to the slip defect items and an offset address 32 is attached to the alternative defect items.

Specifically, the offset address 31 for the slip defect items indicates a relative location of the alternative defect items (or the subsequent defect items) from the beginning of the defect list. If the alternative defect items are the last one in the defect list, the offset address 32 for the last defect items indicates the location of the beginning of the defect list. In the present example, the offset address 32 for the alternative defect item is set to −1.

Figure 9:
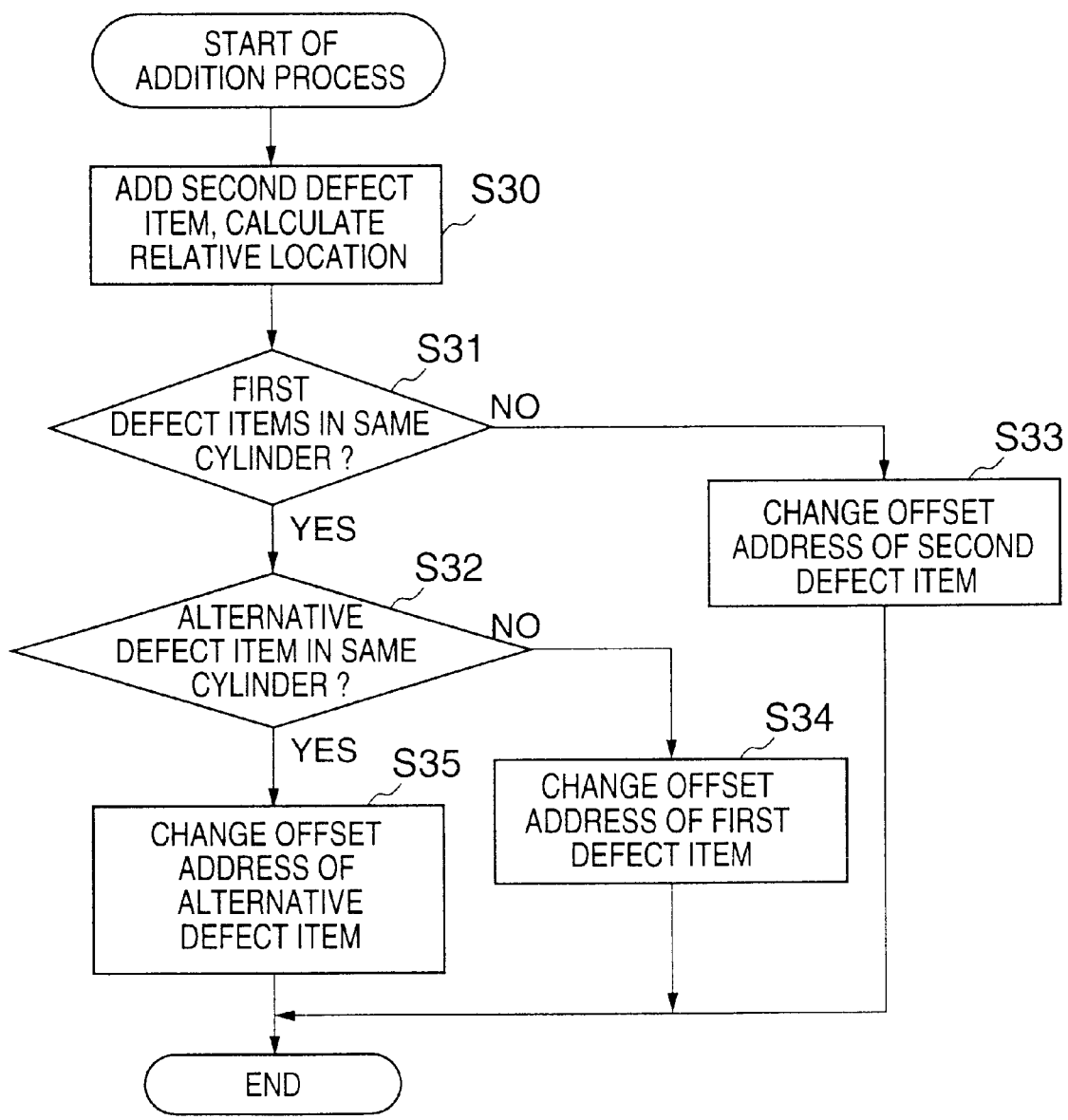
FIG. 9 is a flowchart for explaining a defect information management method of the first preferred embodiment of the invention.

FIG. 9 shows a defect information management method of the first preferred embodiment of the invention. The defect information management method in the present embodiment is a process of addition of new defect information to the defect list. In this addition process, the defect list of FIG. 8 described above is used.

Suppose that a second defect in a certain cylinder of the magnetic disk 2 inclusive of a location indicated by one of the sets of first defect items was detected, and the addition process of FIG. 9 starts at that time to add a second defect item to the defect list.

As shown in FIG. 9, at a start of the addition process, the second defect item is added to the end of the defect list, and a relative location of the added defect item from the beginning of the defect list is calculated (S30).

After the step S30 is performed, it is determined whether the first defect items in the same cylinder as that of the second defect item exist in the defect list (S31). When the result at the step S31 is negative, an offset address of the cylinder of the second defect in the layout table is changed to the calculated location (S33). The second defect in the cylinder of the magnetic disk 2 can be located by using the calculated location.

When the result at the step S31 is affirmative, the first defect items in the same cylinder as that of the second defect item exist in the defect list. It is determined whether the alternative defect item in the same cylinder as that of the second defect item exists in the defect list (S32). When the result at the step S32 is negative, all the first defect items of the cylinder in the defect list are the slip defect items. The offset address of one of the sets of first defect items for the same cylinder in the defect list is changed to the calculated location of the second defect item (S34). The second defect in the cylinder of the magnetic disk 2 can be located by using the resulting defect list (the calculated location).

When the result at the step S32 is affirmative, the alternative defect item in the same cylinder as that of the second defect item exists in the defect list. The offset address of the alternative defect item for the same cylinder in the defect list is changed to the calculated location of the second defect item (S35). The second defect in the cylinder of the magnetic disk 2 can be located by using the resulting defect list (the calculated location). After any of the steps 33, 34 and 35 is performed, the addition process ends.

The defect information management method and apparatus of the present embodiment does not require the transfer of all the subsequent-cylinder defect information when adding new defect information. The defect information management method and apparatus of the present embodiment is effective in providing quick and efficient management of defect information of the storage medium in a magnetic disk system.

Figure 10:
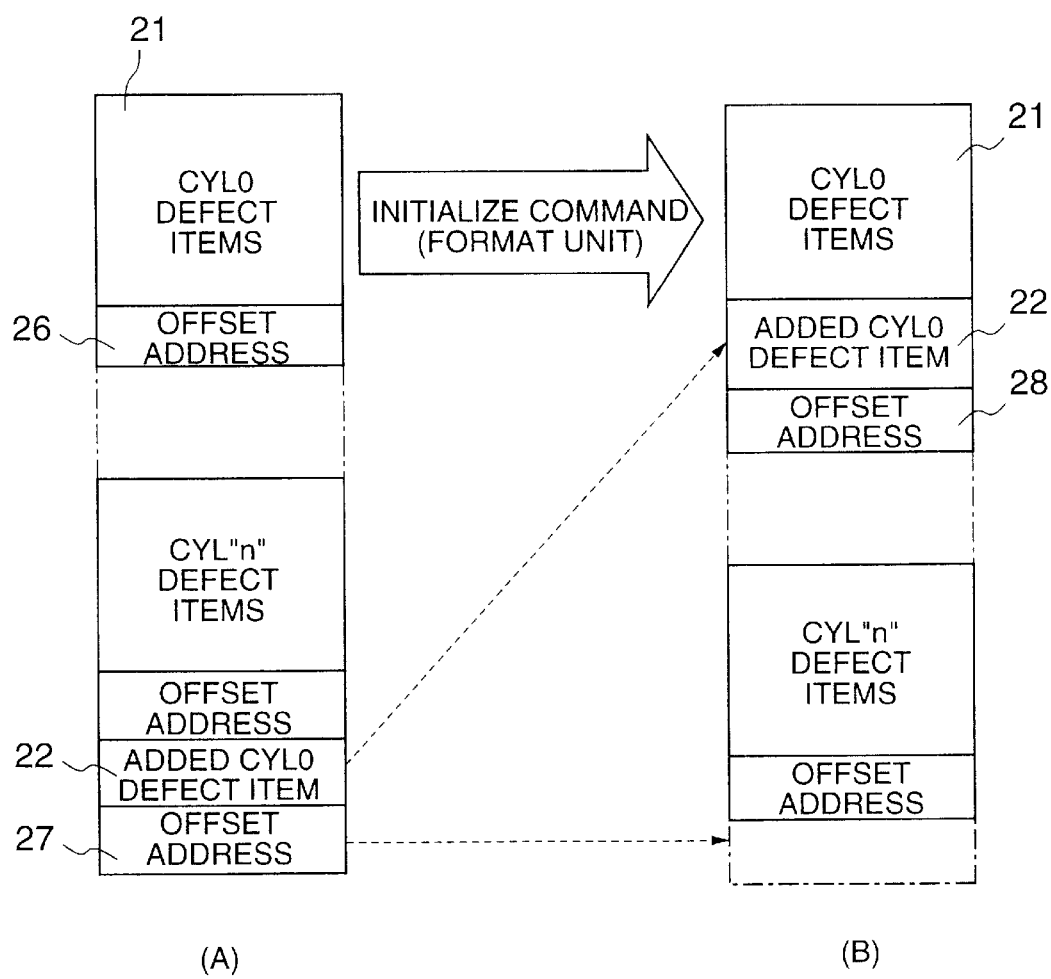
FIG. 10 is a diagram for explaining a process of optimization of the defect list performed when an initialize command is issued.

FIG. 10 shows a process of optimization of the defect list performed when an initialize command is issued.

The optimization process of FIG. 10 for the defect list starts when an initialize command is issued after the addition process of FIG. 7 was performed. The defect list indicated by (A) in FIG. 10 is the same as that indicated by (B) in FIG. 7.

Suppose that an initialize command (format unit) was issued after the end of the addition process. First, it is determined, in response to the initialize command, whether there is the added defect item 22 in the defect list. A corresponding address of the defect list for the end of the set of first defect items 21, which is in the same cylinder as that of the added defect item 22, is obtained. A corresponding address of the defect list for the end of the added defect item 22 is obtained by using a size of the added defect item 22.

The subsequent-cylinder defect items are transferred to the location of the defect list indicated by the end address of the added defect item 22.

As indicated by (B) in FIG. 10, the added defect item 22 is then transferred to the end of the first defect item set in the defect list. The offset address 26 attached to the set of first defect items is changed to the offset address 28 attached to the added defect item 22 after transferred. The offset address 27 at the original location in the defect list is eliminated. In the resulting defect list, all the sets of the defect items are rearranged in sequential order of the cylinder number. Hence, this process is called the optimization of the defect list.

Figure 11:
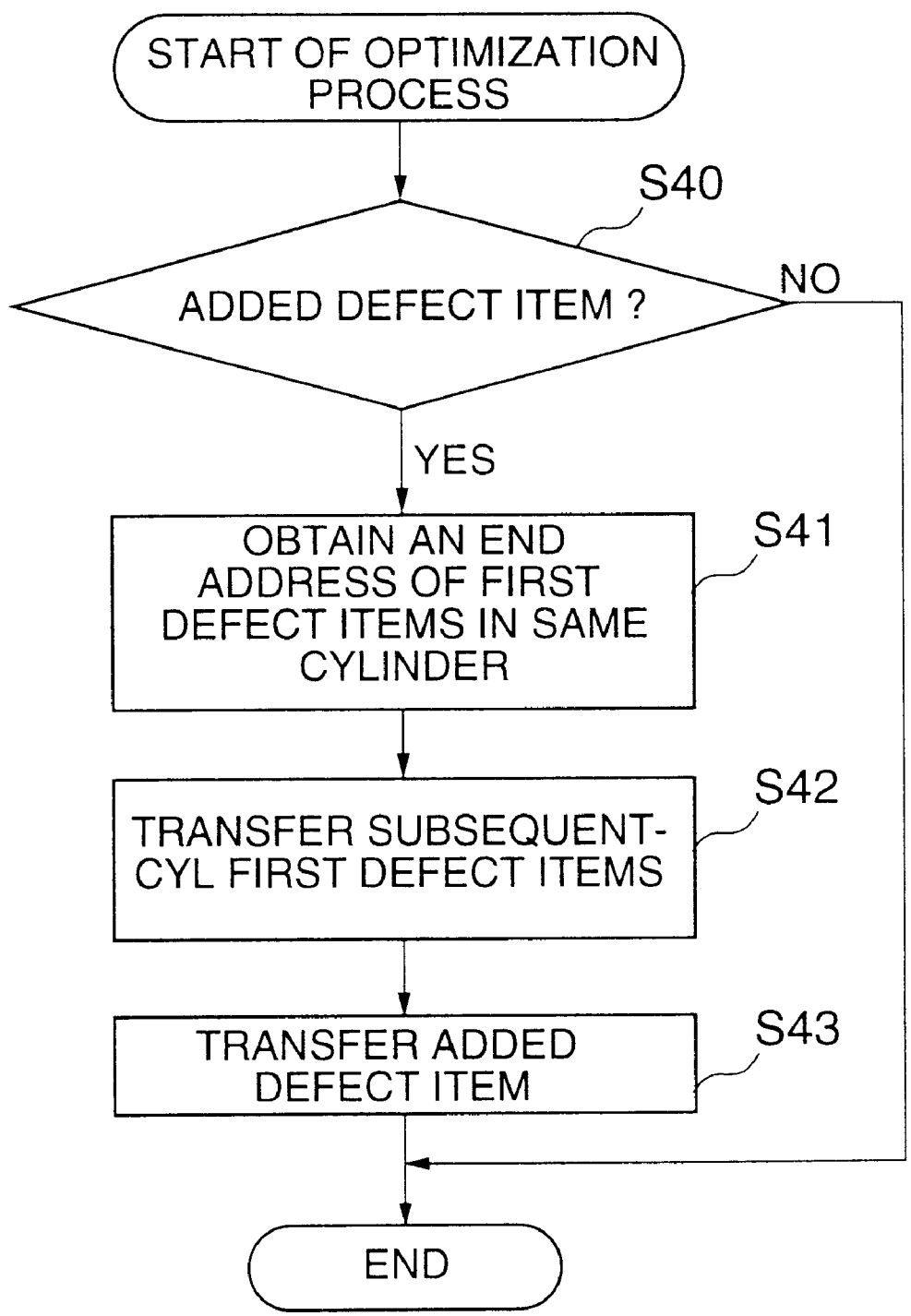
FIG. 11 is a flowchart for explaining a variation of the defect information management method of the first preferred embodiment when an initialize command is issued.

FIG. 11 shows a variation of the defect information management method of the first preferred embodiment when an initialize command is issued. The defect information management method in the present embodiment is a process of optimization of the defect list. In the optimization process, the defect list of FIG. 8 described above is used.

Suppose that an initialize command was issued after the end of the addition process, and the optimization process of FIG. 11 starts at that time to optimize the defect list.

As shown in FIG. 11, at a start of the optimization process, it is determined whether there is the added defect item 22 in the defect list (S40). When the result at the step S40 is negative, the optimization process immediately ends.

When the result at the step S40 is affirmative, a corresponding address of the defect list for the end of the set of first defect items 21 in the same cylinder as that of the added defect item 22 is obtained (S41). Further, a corresponding address of the defect list for the end of the added defect item 22 is obtained by using a size of the added defect item 22 (S41).

After the step S41 is performed, the subsequent-cylinder defect items are transferred to the location of the defect list indicated by the end address of the added defect item 22 (S42).

After the step S42 is performed, the added defect item 22 is transferred to the end of the first defect item set in the defect list (S43). Further, the offset address 26 attached to the set of first defect items is changed to the offset address 28 attached to the added defect item 22 (S43). Further, the offset address 27 at the original location in the defect list is eliminated (S43).

After the step S43 is performed, the optimization process ends. As described above, the resulting defect list, all the sets of the defect items are rearranged in sequential order of the cylinder number as indicated by (B) in FIG. 10.

Accordingly, the defect information management method and apparatus of the present embodiment can update the defect list in the manner shown in FIG. 7, when performing the addition process of FIG. 9, and then can rearrange the defect list in the manner shown in FIG. 10, when performing the optimization process of FIG. 11 in response to the initialize command.

Figure 12:
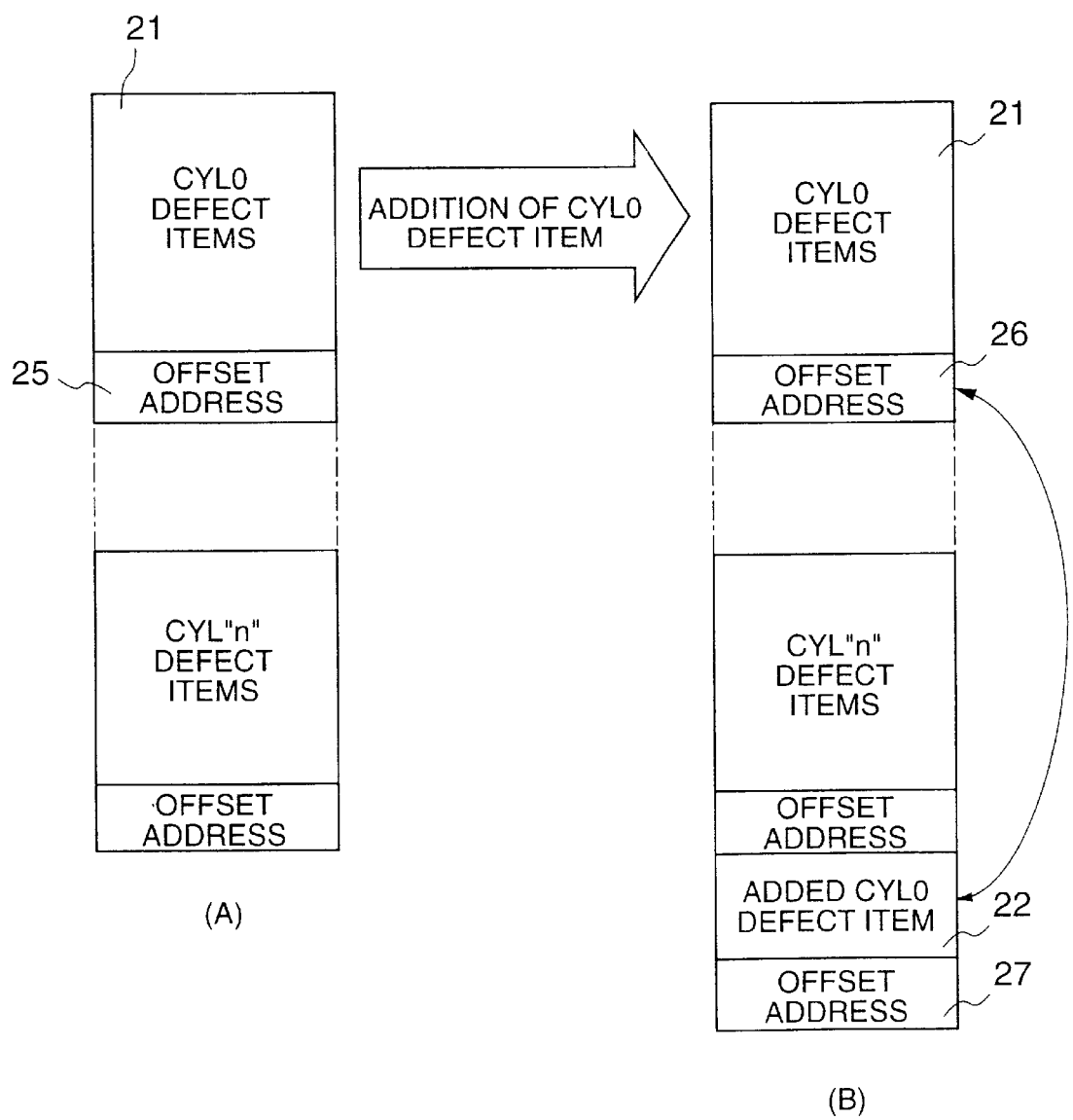
FIG. 12 is a diagram for explaining a process of storing of the new defect information into a non-volatile memory, performed after the new defect information was added.

FIG. 12 shows a process of recording the new defect information in a non-volatile memory, performed after the new defect information was added to the defect list. In the recording process, the new defect information (or the added defect item and the offset address) is recorded in the flash memory 11 or the system memory of the MCU 10 in the magnetic disk system of FIG. 1.

The recording process of FIG. 12 for the nonvolatile memory 11 or the system area of the MCU 10 starts after the end of the addition process of FIG. 7. The defect list indicated by (A) in FIG. 12 is the same as that indicated by (A) in FIG. 7.

As indicated by (B) in FIG. 12, after the end of the addition process, the offset address 26, the added defect item 22 and the offset address 27 are renewed in the defect list. During the recording process, the new defect information is recorded in the nonvolatile memory 11 or the system area of the MCU 10. Hence, the magnetic disk system after the end of the recording process can retain the new defect information even when the power is abruptly removed from the system.

Figure 13:
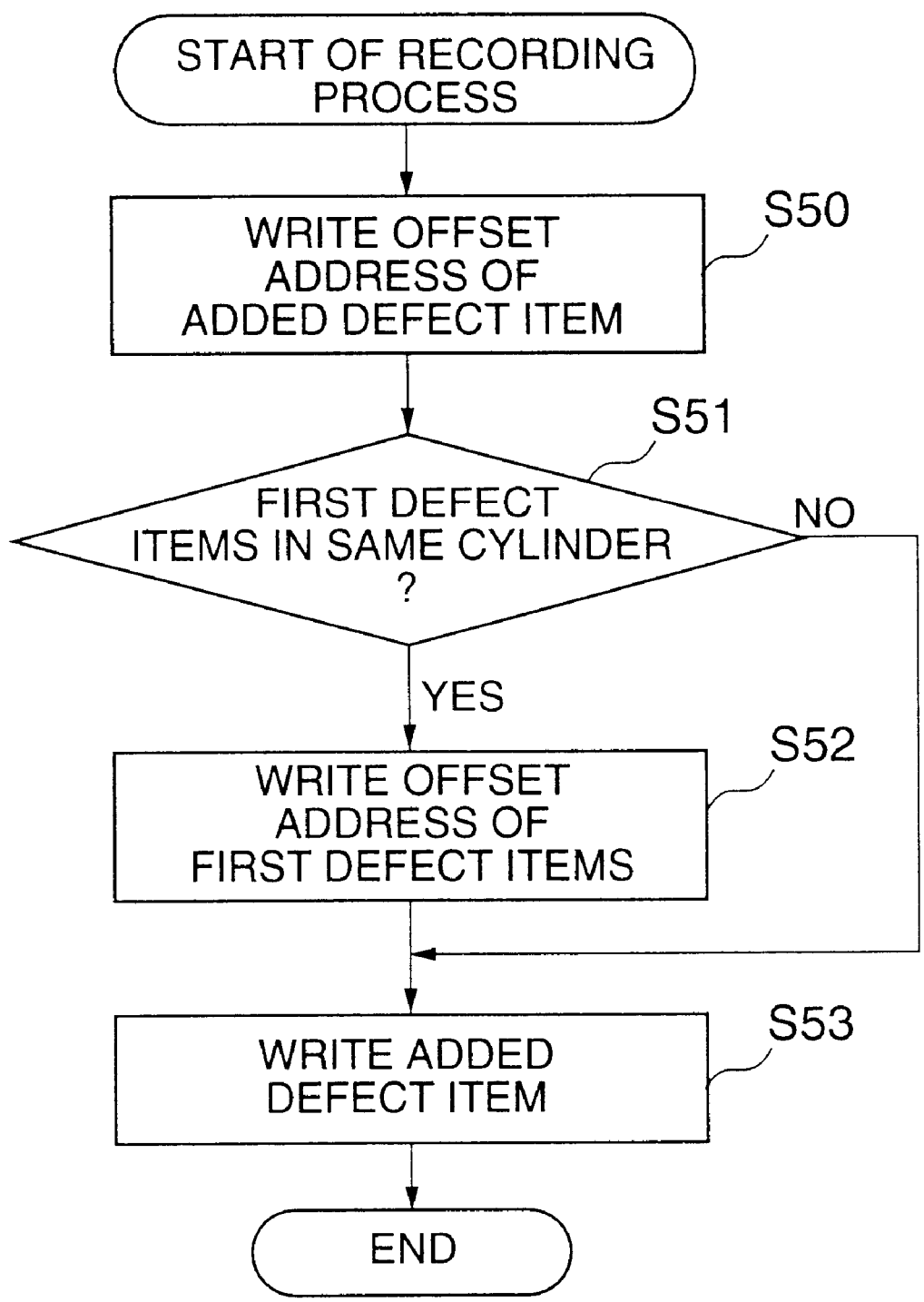
FIG. 13 is a flowchart for explaining a variation of the defect information management method of the first preferred embodiment.

FIG. 13 shows a variation of the defect information management method of the first preferred embodiment. The defect information management method of the present embodiment is a process of recording the new defect information in the nonvolatile memory 11. In the recording process, the defect list indicated by (B) in FIG. 12 is used.

As shown in FIG. 13, at a start of the recording process, the offset address 27 of the added defect item 22 is written to the nonvolatile memory 11 (S50).

After the step S50 is performed, it is determined whether the first defect items in the same cylinder as that of the added defect item 22 exist in the defect list (S51). When the result at the step S51 is affirmative, the offset address of the first defect items in the same cylinder was renewed. The offset address 26 of the first defect items 21 is written to the nonvolatile memory 11 (S52).

When the result at the step S51 is negative, the step S52 is not performed, and the next step S53 is performed. Alternatively, after the step S52 is performed, the next step S53 is performed. In the step S53, the added defect item 22 is written to the nonvolatile memory 11. After the step S53 is performed, the recording process of FIG. 13 ends.

According to the defect information management method of the present embodiment, the new defect information is recorded in the nonvolatile memory 11 or the system area of the MCU 10. Hence, the magnetic disk system after the end of the recording process can retain the new defect information even when the power is abruptly removed from the system.

Figure 14:
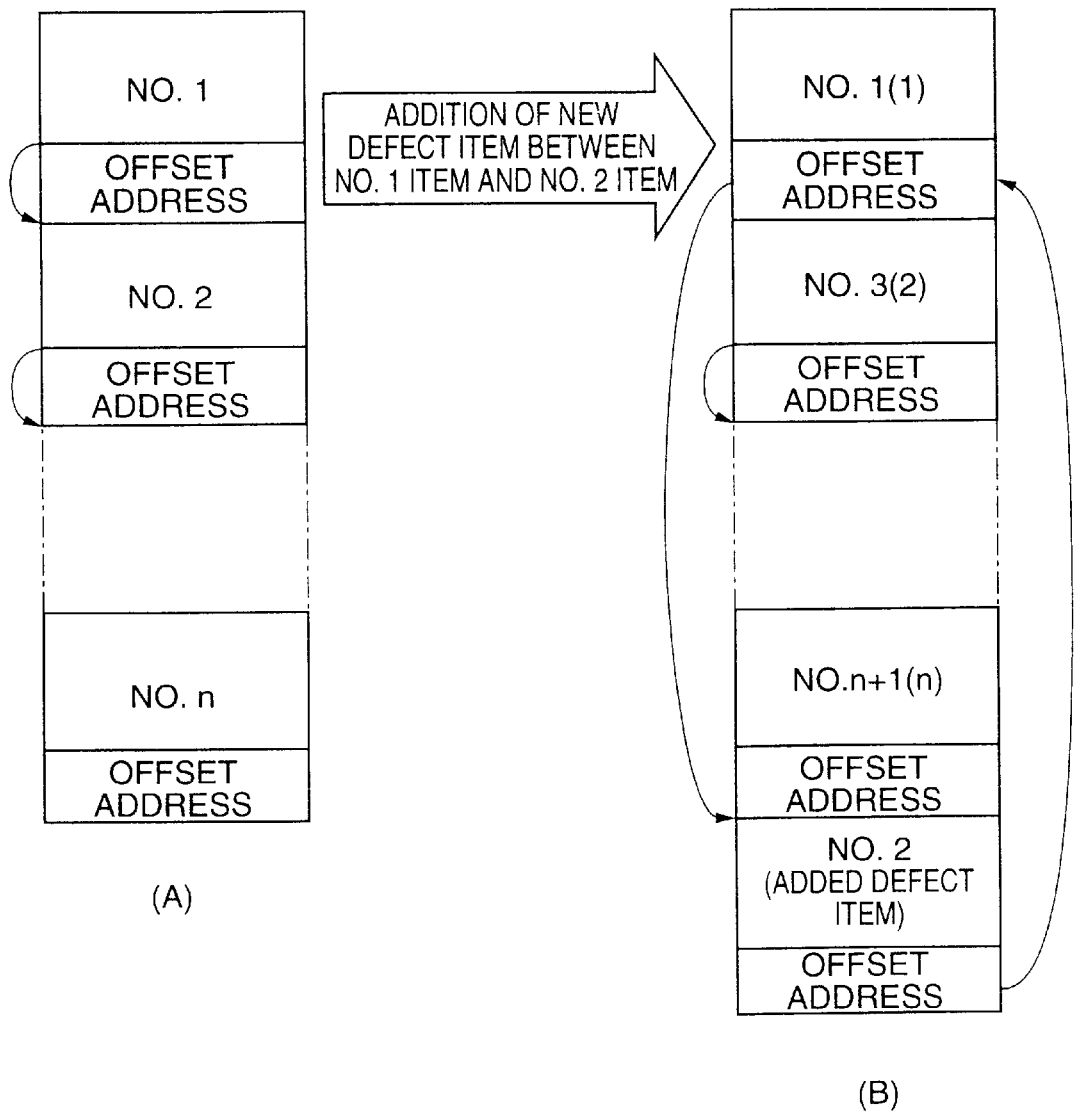
FIG. 14 is a diagram for explaining a process of addition of new defect information to a defect list according to a second preferred embodiment of the invention.

Next, FIG. 14 shows a process of addition of new defect information to a defect list according to a second preferred embodiment of the invention.

Similar to the previous embodiment of FIG. 7, the process of the addition in the present embodiment is executed by the MCU 10.

The defect list in the present embodiment, which is indicated by (A) in FIG. 14, is stored in the magnetic disk 2 of the magnetic disk system of FIG. 1. Further, the stored defect list is transferred to the data buffer 14 for the access. Suppose that the defect list was produced with a sequence of sets of primary defect items with respective offset addresses thereof.

Unlike the defect list of the embodiment of FIG. 7, the sets of the primary defect items in the defect list of the present embodiment are arrayed in sequential order of the cylinder number, the head number and the sector number where the primary defect is located, regardless of the kind of the defects, and the offset address is attached to every defect item. A suitable identifier is assigned for every defect item, such as No. 1, No.2, . . . , No."n". Each primary defect item indicates a location of one of the primary defects on the magnetic disk 2. Each of the offset addresses (excluding the last one) indicates a relative location of the following one of the corresponding set of primary defect items for the offset address in the sequence from the beginning of the defect list.

For example, if a second defect between No. 1 location and No. 2 location in the magnetic disk 2 is detected, it is necessary to add the second defect item to the defect list that initially contains only the primary defect items.

As indicated by (B) in FIG. 14, according to the addition process of the present embodiment, the second defect item is inserted at the end of the defect list. In the present example, the newly detected second defect exists between No. 1 location and No. 2 location in the magnetic disk 2. The identifier "No. 2" is assigned for the added defect item. The identifier for each of the subsequent defect items is incremented to No. 3, . . . , No."n+1". A new offset address is attached to the added defect item (No. 2).

The offset address of No. 1 defect item is changed to indicate a relative location of the added defect item from the beginning of the defect list. The offset address of the added defect item (the new No. 2) at the end of the defect list indicates a relative location of No. 3 defect item from the beginning of the defect list.

Figure 15:
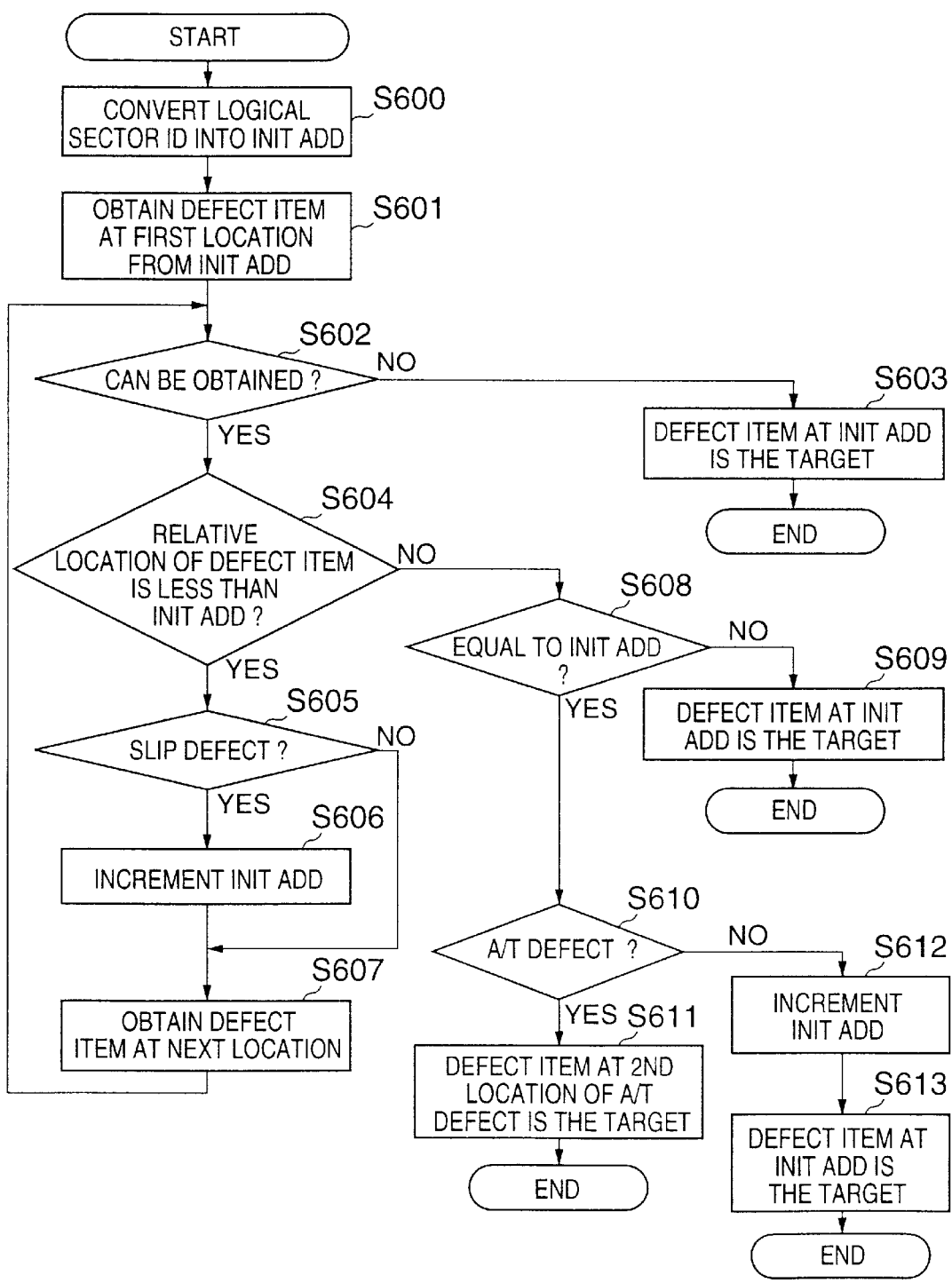
FIG. 15 is a flowchart for explaining a defect information management method of the second preferred embodiment.

FIG. 15 shows a defect information management method of the second preferred embodiment. The defect information management method of the present embodiment is a process of finding a target defect item in the defect list. In the finding process, the defect list, which is indicated by (B) in FIG. 14, is used.

As shown in FIG. 15, at a start of the finding process, the given logical sector identifier of the defect list is converted into an initial address (head number, sector number) (S600). A next defect item in the defect list that is at the first location from the initial address is obtained (S601).

It is determined whether the next defect item at the first location can be obtained (S602). When the result at the step S602 is negative, it is determined that the defect item at the initial address is the target (S603). After the step S603 is performed, the finding process ends.

When the result at the step S602 is affirmative, it is determined whether the relative location of the obtained defect item is less than the initial address (S604). When the result at the step S604 is affirmative, it is determined whether the obtained defect item is a slip defect item (S605). In the case of a slip defect item, the initial address is incremented (S606). Otherwise the step S606 is not performed. After the step S606 or the step S605 is performed, a next defect item in the defect list that is at the next location from the initial address is obtained (S607). After the step S607 is performed, the above steps S602 through S606 are repeated.

When the result at the step S604 is negative, the relative location of the obtained defect item is equal to or larger than the initial address. It is determined whether the relative location of the obtained defect item is equal to the initial address (S608). When the result at the step S608 is negative, it is determined that the defect item at the initial address is the target (S609). After the step S609 is performed, the finding process ends.

When the result at the step S608 is affirmative, the relative location of the obtained defect item is equal to the initial address. It is determined whether the obtained defect item is an alternative defect item (S610). When the result at the step S610 is affirmative, it is determined that the defect item at the second location of the alternative defect item is the target (S611). After the step S611 is performed, the finding process ends.

When the result at the step S610 is negative, the obtained defect item is a slip defect item. The initial address is incremented (S612). Then, it is determined that the defect item at the changed initial address is the target (S613). After the step S613 is performed, the finding process ends.

Accordingly, the defect information management method of the present embodiment is effective in providing an easy, efficient finding process that finds out the target defect item in the defect list, by using the defect list indicated by (B) in FIG. 14.

Figure 16:
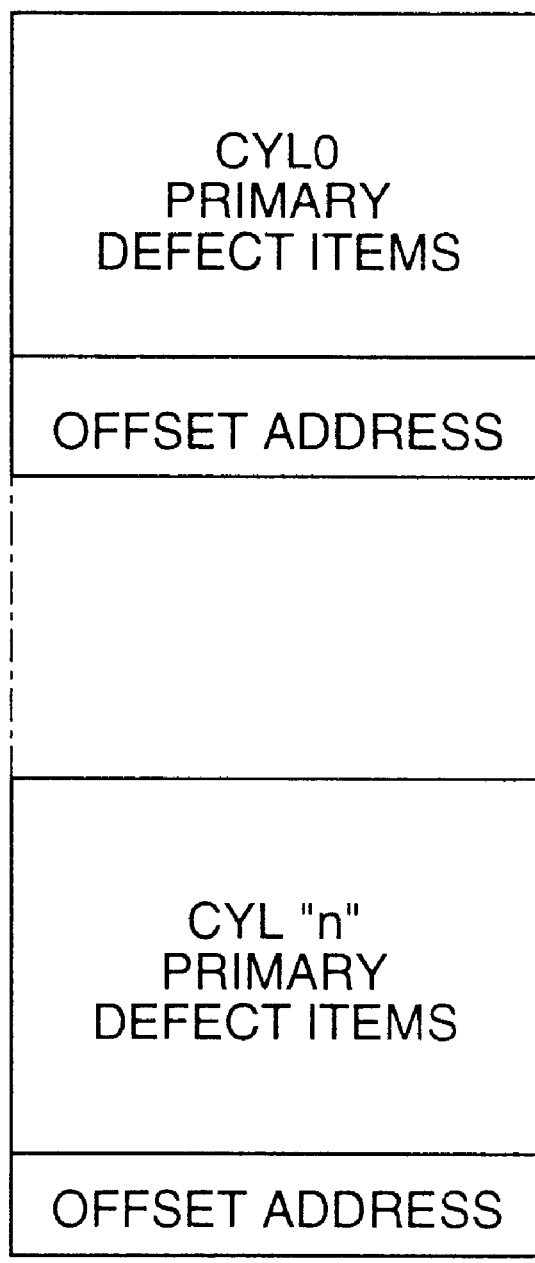
FIG. 16 is a diagram showing a primary defect list used by the defect information management method of the second preferred embodiment.

FIG. 16 shows a primary defect list used by a variation of the defect information management method of the second preferred embodiment.

The primary defect list in the present embodiment, which is shown in FIG. 16, is stored in the magnetic disk 2 of the magnetic disk system of FIG. 1. Further, the stored defect list is transferred to the data buffer 14 for the access. Suppose that the defect list was produced with a sequence of sets of primary defect items with respective offset addresses thereof.

Similar to the defect list of the embodiment of FIG. 7, the sets of the primary defect items in the defect list of the present embodiment are arrayed in sequential order of the cylinder number. Each primary defect item indicates a location of one of the primary defects on the magnetic disk 2. Each of the offset addresses (excluding the last one) indicates a relative location of the following one of the corresponding set of primary defect items for the offset address in the sequence from the beginning of the defect list.

Figure 17:
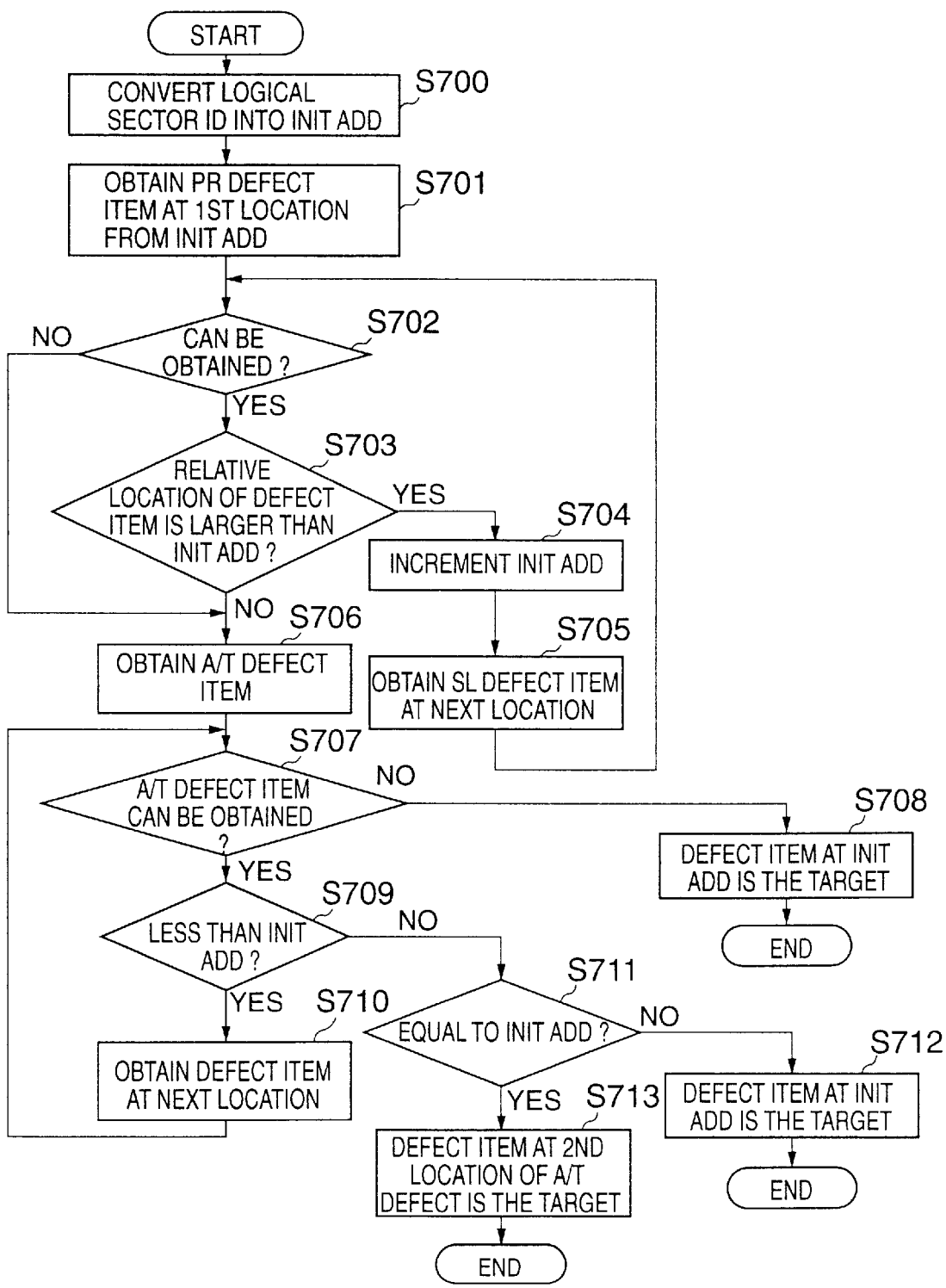
FIG. 17 is a flowchart for explaining a variation of the defect information management method of the second preferred embodiment.

FIG. 17 shows a variation of the defect information management method of the second preferred embodiment. The defect information management method of the present embodiment is a process of finding a target defect item in the defect list. In the finding process, the defect list, which is shown in FIG. 16, is used. The steps of the finding process of FIG. 17 are essentially the same as corresponding steps of the finding process of FIG. 15, and a description thereof will be omitted for the sake of avoiding a duplicate description.

It is readily understood that the defect information management method of the present embodiment is effective in providing an easy, efficient finding process that finds out the target defect item in the defect list, by using the defect list shown in FIG. 16.

Figure 18:
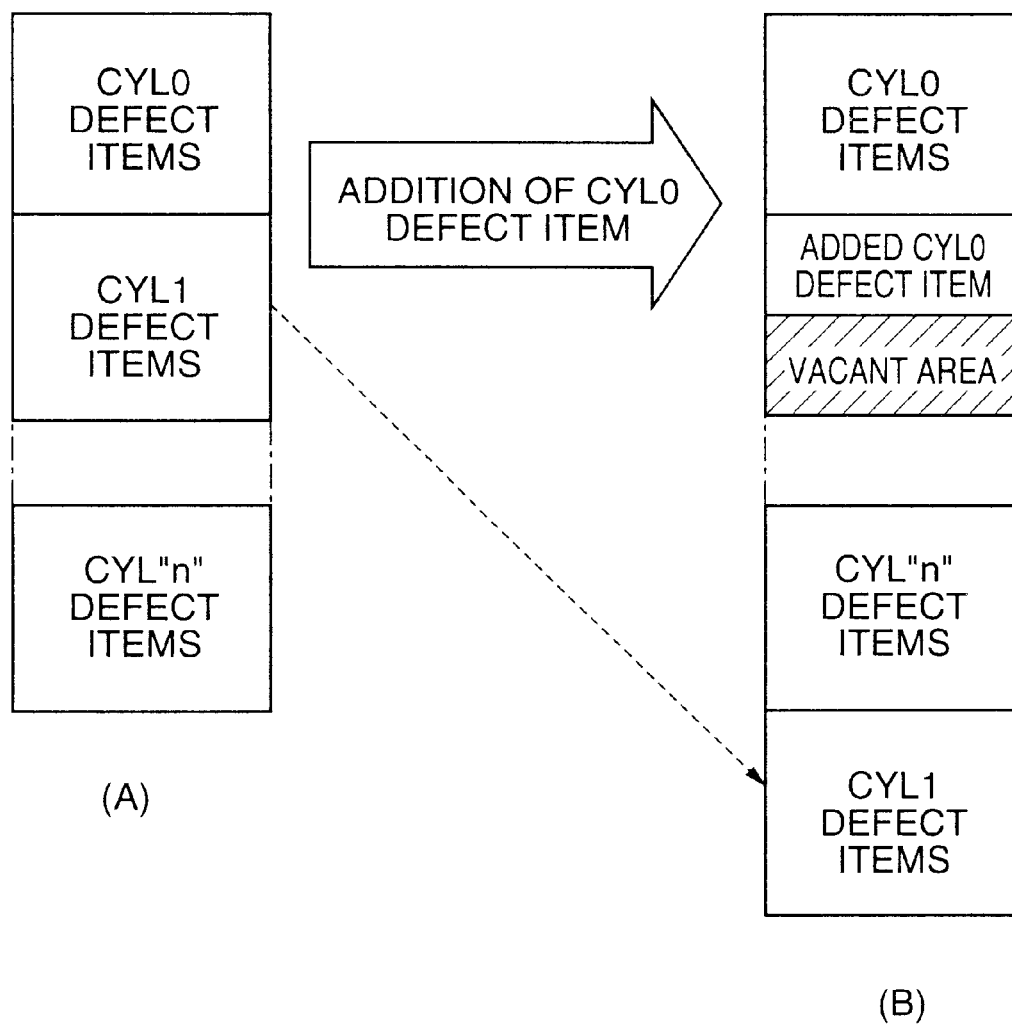
FIG. 18 is a diagram for explaining a process of addition of new defect information to a defect list according to a third preferred embodiment of the invention.

Next, FIG. 18 shows a process of addition of new defect information to a defect list according to a third preferred embodiment of the invention.

The defect list of the present embodiment, which is indicated by (A) in FIG. 18, is stored in the magnetic disk 2 of the magnetic disk system of FIG. 1 and transferred to the data buffer 14 for the access. Suppose that the defect list was produced with a sequence of sets of primary defect items. The sets of the primary defect items in the defect list are arrayed in sequential order of the cylinder numbers of the magnetic disk 2 corresponding to the respective sets. A unique cylinder number is assigned for each of the sets of the primary defect items, such as cylinder0, . . . , cylinder"n". Each primary defect item indicates a location of one of the primary defects on the magnetic disk 2.

The addition process of the present embodiment is executed by the MCU 10. The determining step/unit, the calculating step/unit, the transferring step/unit and the adding step/unit in the defect information management method and apparatus of the claims are achieved by program control instructions stored in the MCU 10.

As indicated by (B) in FIG. 18, according to the process of the addition of the present embodiment, the cylinder0 secondary defect item is inserted at the original location of the next set (cylinder1) of primary defect items in the defect list. In order to achieve this, the next set of primary defect items (the cylinder1 primary defect items) are transferred to the end of the defect list, so as to create a vacant area in the defect list at the original location. Then, when the size of the moved primary defect items is larger than the size of the secondary defect item, the secondary defect item is added to the original location of the moved primary defect items. The vacant area from the end of the added defect item remains unchanged.

Figure 19:
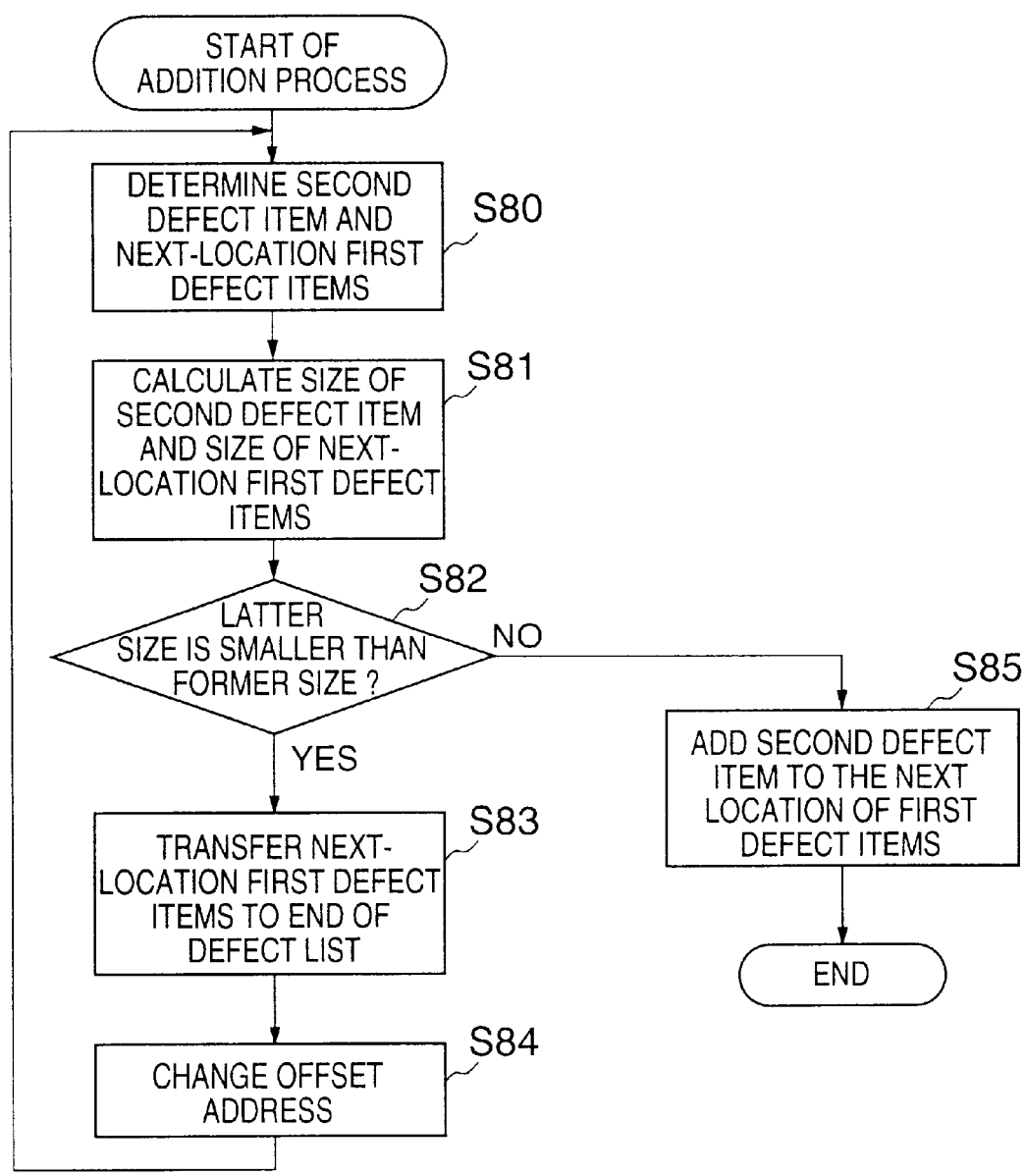
FIG. 19 is a flowchart for explaining a defect information management method of the third preferred embodiment of the invention.

FIG. 19 shows a defect information management method of the third preferred embodiment of the invention. The defect information management method of the present embodiment is a process of addition of new defect information to the defect list. In this addition process, the defect list of FIG. 18 described above is used.

Suppose that a second defect in a certain cylinder of the magnetic disk 2 inclusive of a location indicated by one of the sets of first defect items was detected, and the addition process of FIG. 19 starts at that time to add a second defect item to the defect list.

As shown in FIG. 19, at a start of the addition process, the second defect item, and the next-location first defect items at a location following the location of the first defect items in the same cylinder as that of the second defect item, are determined by using the layout table (S80).

After the step S80 is performed, a size of the second defect item to be added, and a size of the next-location first defect items are calculated (S81). This step is performed to check a size of the vacant area produced after the addition of the second defect item.

After the step S81 is performed, it is determined whether the size of the next-location first defect items is smaller than the size of the second defect item (S82). When the result at the step S82 is affirmative, it is necessary to enlarge the size of the next-location first defect items. The next-location first defect items are transferred to the end of the defect list (S83). The offset address of the next-location first defect items in the layout table is changed so as to be in conformity with the transfer (S84). After the step S84 is performed, the above steps S80 through S83 are repeated until the result at the step S82 indicates a negative answer.

When the result at the step S84 is negative, the size of the next-location first defect items is enough to add the second defect item. Then, the second defect item is added to the original location of the moved first defect items (S85). The vacant area from the end of the added defect item remains unchanged. After the step S85 is performed, the addition process ends.

The defect information management method and apparatus of the present embodiment does not require the transfer of all the subsequent-cylinder defect information when adding new defect information. The defect information management method and apparatus of the present embodiment is effective in providing quick and efficient management of defect information of the storage medium in a magnetic disk system.

Figure 20:
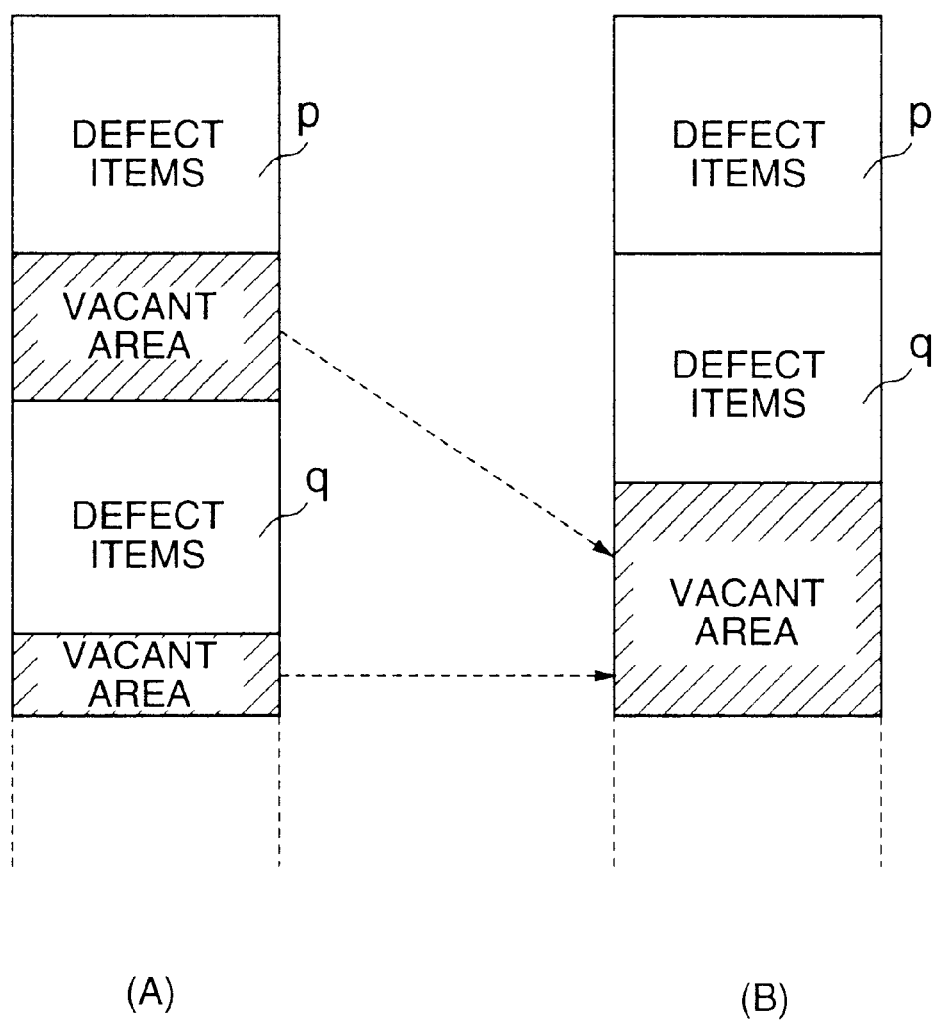
FIG. 20 is a diagram for explaining a process of optimization of the defect list performed after a vacant area was created in the defect information addition process.

FIG. 20 shows a process of optimization of the defect list performed after a vacant area was created in the addition process.

In the defect list of the present embodiment, vacant areas between two adjacent ones of the sets of first defect items may remain after the end of the addition process, as shown in FIG. 18. Suppose that the defect list indicated by (A) in FIG. 20 is in such a condition. In the example of FIG. 20, the former of the two adjacent sets of first defect items is indicated by "p", and the latter is indicated by "q". The vacant areas are produced after the end of the addition process of FIG. 19.

The optimization process of FIG. 20 is to transfer the first defect item set "q" to the end of the first defect item set "p".

so as to merge one of the vacant areas into another in the defect list, as indicated by (B) in FIG. 20. The optimization process of the present embodiment is executed by the MCU 10, and the second transferring step and unit in the defect information management method and apparatus of the claims are achieved by program control instructions stored in the MCU 10.

The optimization process of the present embodiment is effective in increasing the storage space available for adding new defect information.

Figure 21:
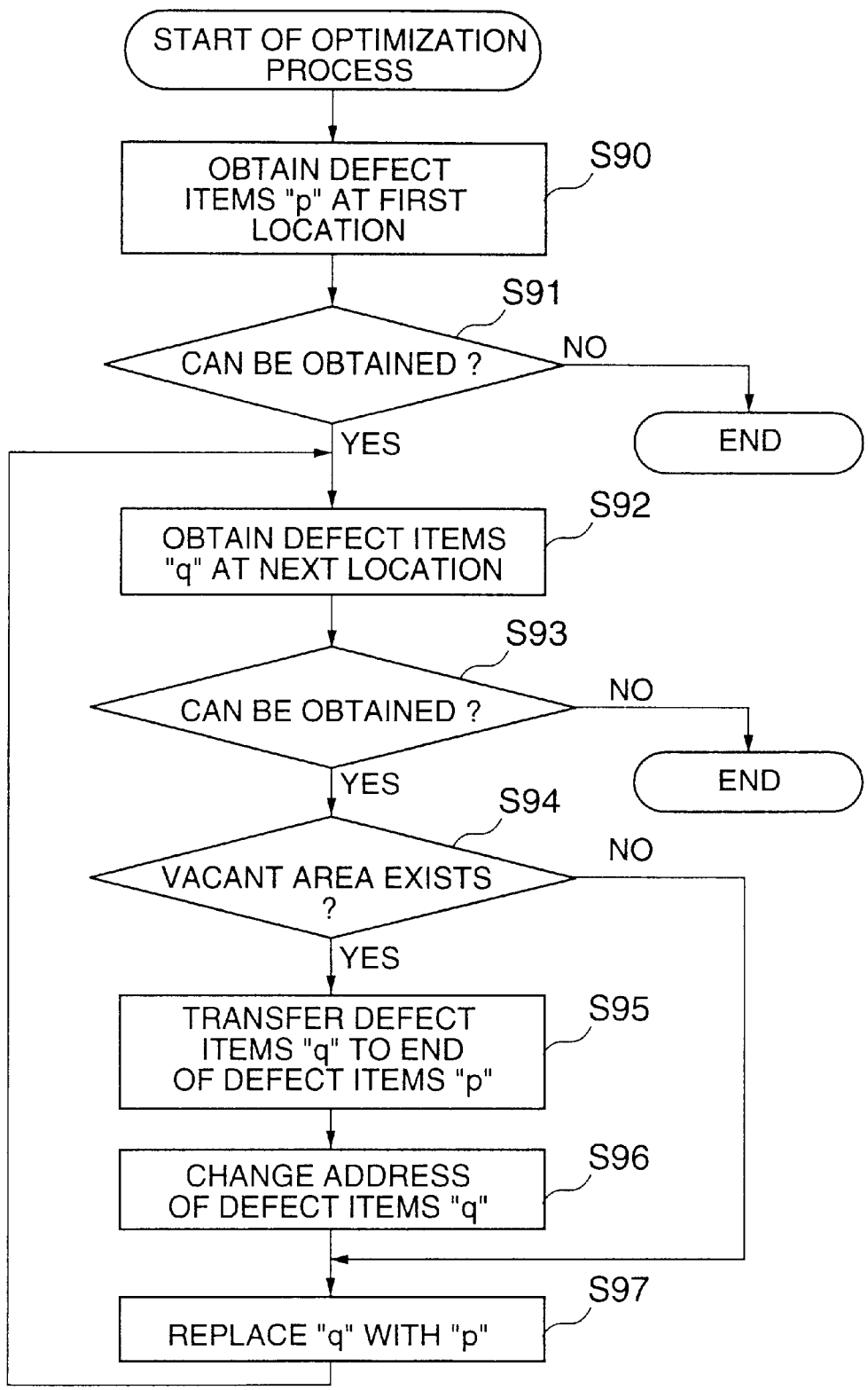
FIG. 21 is a flowchart for explaining a variation of the defect information management method of the third preferred embodiment.

FIG. 21 shows a variation of the defect information management method of the third preferred embodiment. The defect information management method of the present embodiment is a process of optimization of the defect list in the above-mentioned condition after the end of the addition process. In this optimization process, the defect list of FIG. 20 described above is used.

As shown in FIG. 21, at a start of the optimization process, the defect items "p" at the first location in the defect list are obtained or read out (S90). It is determined whether the first location defect items "p" in the defect list can be successfully obtained (S91).

When the result at the step S91 is negative, the optimization process immediately ends. When the result at the step S91 is affirmative, the first-location defect items "p" can be obtained. Then, the defect items "q" at the next location in the defect list are obtained or read out (S92). It is determined whether the next-location defect items "q" in the defect list can be successfully obtained (S93).

When the result at the step S93 is negative, the optimization process immediately ends. When the result at the step S93 is affirmative, it is determined whether a vacant area between the first-location defect items "p" and the next-location defect items "q" in the defect list exists (S94).

When the result at the step S94 is affirmative, the defect items "q" (the latter of the two adjacent sets of first defect items in the defect list) are transferred to the end of the defect items "p" (the former set) (S95). The address of the defect items "q" in the defect list is changed to the new one after the movement (S96). After the step S96 is performed, the value "q" is replaced with the value "p" for the processing of a subsequent location in the defect list (S97).

When the result at the step S94 is negative, the above steps S95 and S96 are not performed and only the step S97 is performed. After the step S97 is performed, the above steps S92 through S96 are repeated until the processing of the end location in the defect list is complete.

The defect information management method and apparatus of the present embodiment are effective in increasing the storage space available for adding new defect information. Further, the defect information management method and apparatus of the present embodiment do not require the transfer of all the subsequent-location defect information when adding new defect information. The defect information management method and apparatus of the present embodiment are effective in providing quick and efficient management of defect information of the storage medium in a magnetic disk system.

Figure 22:
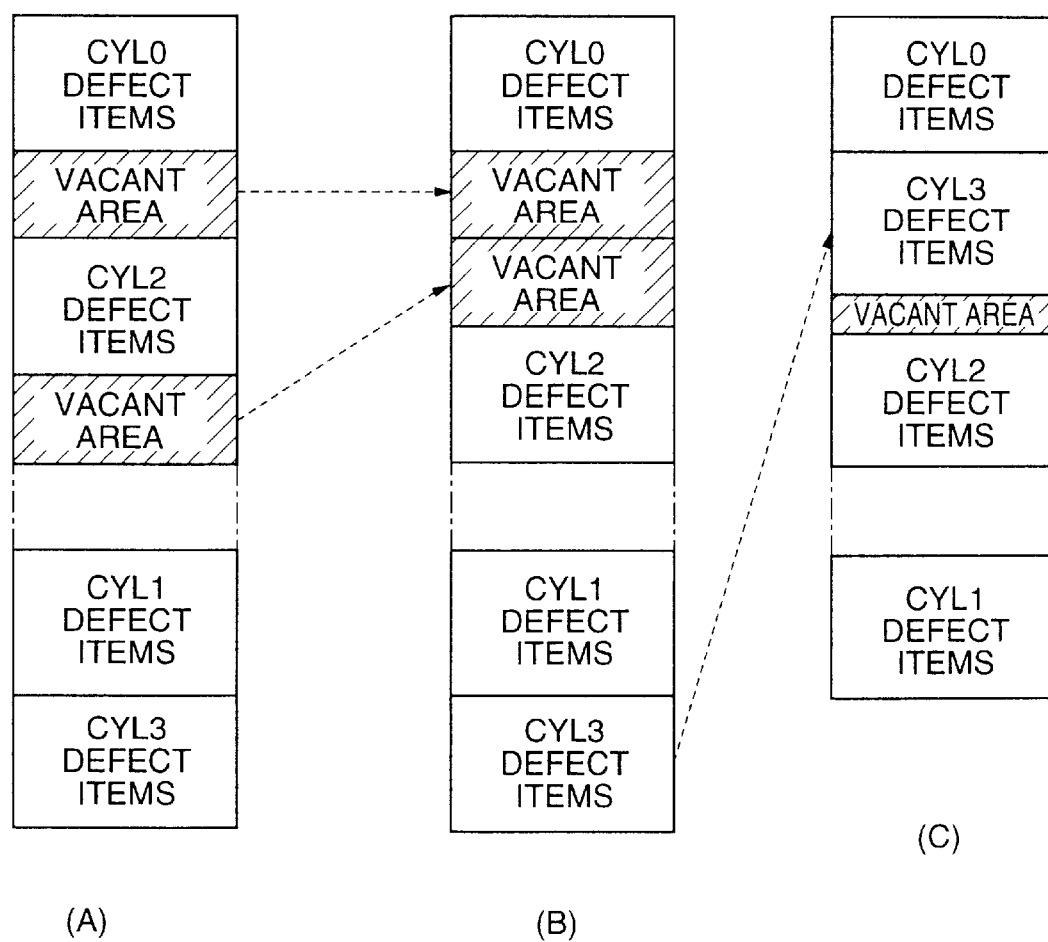
FIG. 22 is a diagram for explaining a process of optimization of the defect list performed after the vacant area was created in the defect information addition process.

FIG. 22 shows a process of optimization of the defect list performed after a vacant area was created in the addition process.

Suppose that a first vacant area between the cylinder0 defect items and the cylinder2 defect items and a second vacant area after the end of the cylinder2 defect items were created in the addition process, as indicated by (A) in FIG. 22. The optimization process of the present embodiment is to merge the second vacant area into the first vacant area by transferring the cylinder2 defect items to a subsequent location in the defect list as indicated by (B) in FIG. 22. Hence, the storage space (or the data buffer 14 in the magnetic disk system of FIG. 1) available can be increased with the merged vacant area. Because of the merged vacant area, the defect information management method of the present embodiment makes it possible to transfer the cylinder3 defect items from the end of the defect list to the end of the cylinders defect items, as indicated by (C) in FIG. 22.

Accordingly, the defect information management method of the present embodiment is effective in increasing the storage space available for adding new defect information.

The present invention is not limited to the above-described preferred embodiments, and variations and modifications may be made without departing from the scope of the present invention.

Further, the present invention is based on Japanese priority application No.11-192313, filed on Jul. 6, 1999, the entire contents of which are hereby incorporated by reference.

What is claimed is:

1. A method for management of defect information used to identify respective locations of defects on a storage medium, comprising the steps of:

providing a defect list which contains a sequence of sets of first defect items with respective offset addresses thereof, each first defect item indicating a location of one of first defects on the storage medium, each of the offset addresses, exclusive of the final one, indicating a relative location of a following one of the corresponding set of first defect items for the offset address in the sequence from a beginning of the defect list;

adding a second defect item to an end of the defect list when a second defect in a portion of the storage medium inclusive of a location identified by one of the sets of first defect items is detected;

calculating a relative location of the second defect item from the beginning of the defect list;

changing the offset address of said one of the sets of first defect items to the calculated location of the second defect item to form a resulting defect list, so that the second defect can be located by using the resulting defect list; and repeating the above steps using the resulting defect list as the defect list to form an updated resulting defect list without retrieving each defect in the resulting defect list.

2. The method according to claim 1, further comprising the step of adding a new defect item and an offset address thereof to the end of the defect list when none of the first defects exists in a portion of the storage medium inclusive of a location identified by the new defect item, the offset address of the new defect item, added to the end of the defect list, indicating a relative location of the new defect item from the beginning of the defect list.

3. A method for management of defect information used to identify respective locations of defects on a storage medium, comprising the steps of:

providing a defect list which contains a sequence of sets of first defect items, the sets of first defect items being arranged in sequential order of cylinder numbers of the storage medium corresponding to the respective sets, each first defect item indicating a location of one of first defects on the storage medium;

determining, when a second defect in a portion of the storage medium inclusive of a location identified by one of the sets of first defect items is detected, a second defect item as well as a next set of first defect items following said one of the sets of first defect items in the sequence;

calculating a size of the next set of first defect items and a size of the second defect item;

transferring the next set of first defect items from an original location thereof to an end of the defect list, so as to create a vacant area in the defect list at the original location; and adding the second defect item to the original location of the defect list when the size of the next set of first defect items is larger than the size of the second defect item.

4. The method according to claim 3, further comprising the step of transferring, when vacant areas between two adjacent ones of the sets of first defect items in the defect list remain, the latter of the two adjacent sets to an end of the former of the two adjacent ones, so as to merge one of the vacant areas into another in the defect list.

5. An apparatus for management of defect information used to identify respective locations of defects on a storage medium, comprising:

a defect list which contains a sequence of sets of first defect items with respective offset addresses thereof, each first defect item indicating a location of one of first defects on the storage medium, each of the offset addresses, exclusive of the final one, indicating a relative location of a following one of the corresponding set of first defect items for the offset address in the sequence from a beginning of the defect list without retrieving each defect in the resulting defect list;

a defect-item adding unit which adds a second defect item to an end of the defect list when a second defect in portion of the storage medium inclusive of a location identified by one of the sets of first defect items is detected;

a relative-location calculating unit which calculates a relative location of the second defect item from the beginning of the defect list;

an offset-address changing unit which changes the offset address of said one of the sets of first defect items to the calculated location of the second defect item to form a resulting defect list, so that the second defect can be located by using the resulting defect list; and repeating the above steps using the resulting defect list as the defect list to form an updated resulting defect list.

6. The apparatus according to claim 5, further comprising a new defect-item adding unit which adds a new defect item and an offset address thereof to the end of the defect list when none of the first defects exists in a portion of the storage medium inclusive of a location identified by the new defect item, the offset address of the new defect item, added to the end of the defect list, indicating a relative location of the new defect item from the beginning of the defect list.

7. An apparatus for management of defect information used to identify respective locations of defects on a storage medium, comprising:

a defect list which contains a sequence of sets of first defect items, the sets of first defect items being arranged in sequential order of cylinder numbers of the storage medium corresponding to the respective sets, each first defect item indicating a location of one of first defects on the storage medium;

a determining unit which determines, when a second defect in a portion of the storage medium inclusive of a location identified by one of the sets of first defect items is detected, a second defect item as well as a next set of first defect items following said one of the sets of first defect items in the sequence;

a calculating unit which calculates a size of the next set of first defect items and a size of the second defect item;

a transferring unit which transfers the next set of first defect items from an original location thereof to an end of the defect list, so as to create a vacant area in the defect list at the original location; and an adding unit which adds the second defect item to the original location of the defect list when the size of the next set of first defect items is larger than the size of the second defect item.

8. The apparatus according to claim 7, further comprising a second transferring unit which transfers, when vacant areas between two adjacent ones of the sets of first defect items in the defect list remain, the latter of the two adjacent sets to an end of the former of the two adjacent ones, so as to merge one of the vacant areas into another in the defect list.

* * * * *